US012139909B2

(12) United States Patent
Ziegler

(10) Patent No.: US 12,139,909 B2
(45) Date of Patent: Nov. 12, 2024

(54) METHOD TO PRODUCE A BUILDING PANEL AND A BUILDING PANEL

(71) Applicant: Välinge Innovation AB, Viken (SE)

(72) Inventor: Göran Ziegler, Viken (SE)

(73) Assignee: VÄLINGE INNOVATION AB, Viken (SE)

( * ) Notice: Subject to any disclaimer, the term of this patent is extended or adjusted under 35 U.S.C. 154(b) by 232 days.

(21) Appl. No.: 17/697,417

(22) Filed: Mar. 17, 2022

(65) Prior Publication Data

US 2022/0298789 A1 Sep. 22, 2022

(30) Foreign Application Priority Data

Mar. 19, 2021 (SE) .................................... 2150315-6

(51) Int. Cl.

| | |
|---|---|
| ***B27D 1/04*** | (2006.01) |
| ***E04C 2/16*** | (2006.01) |
| ***E04C 2/20*** | (2006.01) |
| ***E04C 2/24*** | (2006.01) |

(52) U.S. Cl.

CPC ................ *E04C 2/246* (2013.01); *B27D 1/04* (2013.01); *E04C 2/16* (2013.01); *E04C 2/20* (2013.01)

(58) Field of Classification Search

None

See application file for complete search history.

(56) References Cited

U.S. PATENT DOCUMENTS 2,831,794 A 4/1958 Elmendorf
3,677,868 A 7/1972 Boggs
7,811,489 B2 10/2010 Pervan
8,302,367 B2 11/2012 Schulte
8,349,234 B2 1/2013 Ziegler et al.
8,349,235 B2 1/2013 Pervan et al.
8,407,963 B2 4/2013 Schulte
8,419,877 B2 4/2013 Pervan et al.
8,431,054 B2 4/2013 Pervan et al.
8,480,841 B2 7/2013 Pervan et al.
8,481,111 B2 7/2013 Ziegler et al.
8,499,520 B2 8/2013 Schulte
8,617,439 B2 12/2013 Pervan et al.
8,635,829 B2 1/2014 Schulte
8,650,738 B2 2/2014 Schulte (Continued)

FOREIGN PATENT DOCUMENTS

CN 209799254 U 12/2019
JP 10-211674 A 8/1998

(Continued)

OTHER PUBLICATIONS

U.S. Appl. No. 17/769,594, Rickard Rittinge, filed Apr. 15, 2022.

(Continued)

*Primary Examiner* — Christopher T Schatz

(74) *Attorney, Agent, or Firm* — Boone IP Law

(57) ABSTRACT

A method to produce a building panel, including providing a core, applying a first paper layer on a first surface of the core, wherein the first paper layer includes a resin impregnated paper, applying refined lignocellulosic fibres on the first paper layer, applying a wood veneer layer above the refined lignocellulosic fibres, applying pressure to the core, the first paper layer, the refined lignocellulosic fibres, and the wood veneer layer to form a building panel. Also, to such building panel.

12 Claims, 5 Drawing Sheets

(56) References Cited

U.S. PATENT DOCUMENTS 8,663,785 B2 3/2014 Ziegler et al.
8,728,564 B2 5/2014 Ziegler et al.
8,752,352 B2 6/2014 Schulte
8,784,587 B2 7/2014 Lindgren et al.
8,920,874 B2 12/2014 Ziegler et al.
8,920,876 B2 12/2014 Vetter et al.
8,993,049 B2 3/2015 Pervan
9,085,905 B2 7/2015 Persson et al.
9,109,366 B2 8/2015 Schulte
9,181,698 B2 11/2015 Pervan et al.
9,255,405 B2 2/2016 Pervan et al.
9,296,191 B2 3/2016 Pervan et al.
9,352,499 B2 5/2016 Ziegler et al.
9,403,286 B2 8/2016 Vetter et al.
9,410,319 B2 8/2016 Ziegler et al.
9,556,622 B2 1/2017 Pervan et al.
9,783,996 B2 10/2017 Pervan et al.
10,017,950 B2 7/2018 Pervan
10,100,535 B2 10/2018 Pervan et al.
10,214,913 B2 2/2019 Persson et al.
10,286,633 B2 5/2019 Lundblad et al.
10,315,219 B2 6/2019 Jacobsson
10,344,379 B2 7/2019 Pervan et al.
10,364,578 B2 7/2019 Pervan
10,392,812 B2 8/2019 Pervan
10,442,152 B2 10/2019 Schulte
10,442,164 B2 10/2019 Schulte
10,493,729 B2 12/2019 Pervan et al.
10,513,094 B2 12/2019 Persson et al.
10,800,186 B2 10/2020 Pervan et al.
10,828,881 B2 11/2020 Bergelin et al.
10,857,765 B2 12/2020 Schulte
10,899,166 B2 1/2021 Pervan et al.
10,913,176 B2 2/2021 Lindgren et al.
10,926,509 B2 2/2021 Schulte
10,981,362 B2 4/2021 Ziegler et al.
10,988,941 B2 4/2021 Ziegler et al.
11,040,371 B2 6/2021 Jacobsson
11,046,063 B2 6/2021 Persson et al.
11,072,156 B2 7/2021 Schulte
11,090,972 B2 8/2021 Persson et al.
11,135,814 B2 10/2021 Pervan et al.
11,167,533 B2 11/2021 Ziegler et al.
11,235,565 B2 2/2022 Pervan et al.
11,313,123 B2 4/2022 Pervan et al.
11,318,726 B2 5/2022 Pervan et al.
2006/0172118 A1 8/2006 Han et al.
2009/0145066 A1 6/2009 Pervan
2009/0155612 A1 6/2009 Pervan et al.
2010/0092731 A1 4/2010 Pervan et al.
2010/0291397 A1 11/2010 Pervan et al.
2010/0300030 A1 12/2010 Pervan et al.
2010/0323187 A1 12/2010 Kalwa
2011/0175251 A1 7/2011 Ziegler et al.
2011/0177319 A1 7/2011 Ziegler et al.
2011/0177354 A1 7/2011 Ziegler et al.
2011/0189448 A1 8/2011 Lindgren et al.
2011/0247748 A1 10/2011 Pervan et al.
2011/0250404 A1 10/2011 Pervan et al.
2011/0293906 A1 12/2011 Jacobsson
2012/0124932 A1 5/2012 Schulte et al.
2012/0263878 A1 10/2012 Ziegler et al.
2012/0263965 A1 10/2012 Persson et al.
2012/0264853 A1 10/2012 Ziegler et al.
2012/0308774 A1 12/2012 Persson et al.
2013/0092314 A1 4/2013 Zeigler et al.
2013/0095315 A1 4/2013 Pervan et al.
2013/0189534 A1 7/2013 Pervan et al.
2013/0269863 A1 10/2013 Pervan et al.
2013/0273244 A1 10/2013 Vetter et al.
2013/0273245 A1 10/2013 Ziegler et al.
2014/0044872 A1 2/2014 Pervan
2014/0075874 A1 3/2014 Pervan et al.
2014/0171554 A1 6/2014 Ziegler et al.
2014/0178630 A1 6/2014 Pervan et al.
2014/0186610 A1 7/2014 Pervan
2014/0199558 A1 7/2014 Pervan et al.
2014/0234531 A1 8/2014 Ziegler et al.
2015/0017461 A1 1/2015 Lindgren et al.
2015/0079280 A1 3/2015 Vetter et al.
2015/0093502 A1 4/2015 Ziegler et al.
2015/0111055 A1 4/2015 Persson et al.
2015/0159382 A1 6/2015 Pervan
2015/0197942 A1 7/2015 Pervan et al.
2015/0197943 A1 7/2015 Ziegler et al.
2015/0275526 A1 10/2015 Persson et al.
2015/0298433 A1 10/2015 Kalwa
2016/0031189 A1 2/2016 Pervan et al.
2016/0114495 A1 4/2016 Pervan et al.
2016/0186318 A1 6/2016 Pervan et al.
2016/0230400 A9 8/2016 Pervan et al.
2016/0368180 A1 12/2016 Ziegler et al.
2016/0369507 A1 12/2016 Pervan et al.
2016/0375674 A1 12/2016 Schulte
2017/0120564 A1 5/2017 Schulte
2017/0165936 A1 6/2017 Schulte
2017/0190156 A1 7/2017 Lundblad et al.
2017/0305119 A1 10/2017 Bergelin et al.
2017/0348984 A1 12/2017 Pervan et al.
2018/0002934 A1 1/2018 Pervan et al.
2018/0291638 A1 10/2018 Pervan
2018/0370278 A1 12/2018 Persson et al.
2019/0010711 A1 1/2019 Pervan et al.
2019/0202178 A1 7/2019 Ziegler
2019/0210329 A1 7/2019 Ziegler et al.
2019/0210330 A1 7/2019 Ziegler et al.
2019/0277039 A1 9/2019 Håkansson et al.
2019/0284821 A1 9/2019 Pervan
2019/0292796 A1 9/2019 Pervan et al.
2019/0338534 A1 11/2019 Pervan
2020/0055287 A1 2/2020 Lundblad et al.
2020/0078825 A1 3/2020 Jacobsson
2020/0079059 A1 3/2020 Schulte
2020/0094512 A1 3/2020 Schulte
2020/0164622 A1 5/2020 Pervan et al.
2020/0215799 A1 7/2020 Hedlund et al.
2020/0223197 A1 7/2020 Hedlund et al.
2021/0001647 A1 1/2021 Pervan et al.
2021/0008863 A1 1/2021 Bergelin et al.
2021/0078305 A1 3/2021 Schulte
2021/0101310 A1 4/2021 Lindgren et al.
2021/0197534 A1 7/2021 Ziegler et al.
2021/0277670 A1 9/2021 Ziegler et al.
2021/0323297 A1 10/2021 Slottemo et al.
2022/0009248 A1 1/2022 Ryberg et al.
2022/0024189 A1 1/2022 Ziegler et al.
2022/0024195 A1 1/2022 Schulte
2022/0063326 A1 3/2022 Persson et al.
2022/0176582 A1 6/2022 Nilsson

FOREIGN PATENT DOCUMENTS

KR 20-0324825 Y1 8/2003
WO WO 2015/105455 A1 7/2015
WO WO 2015/105456 A1 7/2015

OTHER PUBLICATIONS

U.S. Appl. No. 17/768,022, Rickard Rittinge, filed Apr. 11, 2022.
U.S. Appl. No. 17/038,567, Marcus Bergelin, filed Sep. 30, 2020.
U.S. Appl. No. 17/090,511, Guido Schulte, filed Nov. 5, 2020.
U.S. Appl. No. 17/543,962, Magnus Nilsson, filed Dec. 7, 2021.
U.S. Appl. No. 17/711,487, Darko Pervan, filed Apr. 1, 2022.
U.S. Appl. No. 17/747,325, Göran Ziegler, filed May 18, 2022.
U.S. Appl. No. 18/047,755, Guido Schulte, filed Oct. 19, 2022.
U.S. Appl. No. 18/157,811, Anette Hedlund, filed Jan. 20, 2023.
U.S. Appl. No. 16/365,764, Christer Lundblad, filed Mar. 27, 2019.
U.S. Appl. No. 18/289,506, Göran Ziegler, filed Nov. 3, 2023.
U.S. Appl. No. 18/392,427, Göran Ziegler, filed Dec. 21, 2023.
International Preliminary Report on Patentability received for PCT Patent Application No. PCT/SE2022/050256, mailed on Sep. 28, 2023, 10 pages.

(56) References Cited

OTHER PUBLICATIONS

International Search Report and Written Opinion received for PCT Patent Application No. PCT/SE2022/050256 mailed on May 17, 2022, 17 pages.
U.S. Appl. No. 18/576,241, Rickard Rittinge, filed Jan. 3, 2024.
U.S. Appl. No. 18/576,294, Rickard Rittinge, filed Jan. 3, 2024.
U.S. Appl. No. 18/741,549, Daniel Scialanga, filed Jun. 12, 2024.
Pervan, Darko, et al., U.S. Appl. No. 17/711,487 entitled "Wood Fibre Based Panel with a Surface Layer," filed Apr. 1, 2022.
Rittinge, Rickard, et al., U.S. Appl. No. 17/769,594 entitled "Wood Fibre Based Panel and a Method for Obtaining Such Panel," filed Apr. 15, 2022.
Ziegler, Göran, et al., U.S. Appl. No. 17/747,325 entitled "Method of Producing a Veneered Element," filed May 18, 2022.

METHOD TO PRODUCE A BUILDING PANEL AND A BUILDING PANEL

CROSS REFERENCE TO RELATED APPLICATIONS

The present application claims the benefit of Swedish Application No. 2150315-6, filed on Mar. 19, 2021. The entire contents of Swedish Application No. 2150315-6 are hereby incorporated herein by reference in their entirety.

TECHNICAL FIELD

Embodiments of the present disclosure relate to a method to produce a building panel comprising a wood veneer layer, and such a building panel.

TECHNICAL BACKGROUND

Floor coverings having a wooden surface may be of several different types. Solid wood floorings are formed of a solid piece of wood in form of a plank.

Engineered wood floorings are formed of a surface layer of wood glued to a core. The core may be a lamella core or a wood-based panel, such as plywood, MDF or HDF. The wooden surface layer may, as an example, have a thickness of 2-10 mm.

A wooden floor covering may also be formed by gluing a wood veneer to a core, for example, a wood-based panel, such as particleboard, MDF or HDF. Wood veneer is a thin wood layer, for example having a thickness of 0.2-1 mm. A flooring with a separate surface layer glued to a core of, for example, HDF or plywood, is more moisture stable than solid wood floorings.

Compared to solid wood and engineered wood floorings, wood veneer floorings can be produced to a lower cost since only a thin wood layer is used. However, a wood veneer layer cannot be sanded as a solid wood or engineered wood flooring can be.

As an alternative to wood floorings, laminate floorings are also available. Direct pressed laminated (DPL) flooring usually comprises a core of a 6-12 mm HDF, a 0.2 mm thick upper decorative surface layer of laminate and a 0.1-0.2 mm thick lower balancing layer of laminate.

A wood veneer flooring may have a lower impact resistance than laminate floorings and the production cost is high, compared to laminate floorings, when high quality veneers are to be used.

In order to improve impact resistance of a wood veneer flooring, a sub-layer may be arranged between the wood veneer layer and the core. WO 2009/065769 discloses a thin surface layer, such as wood veneer layer, which is applied on a sub-layer comprising, for example, cork or wood fibres mixed with a binder. The sub-layer is applied on a wood fibre based core.

U.S. Pat. No. 2,831,794 discloses a process for manufacturing veneer panels. On a green veneer, an adhesive is applied. Loose ligno-cellulose fibrous particles of the core, with a binder, is applied on the adhesive, and may be compacted without bonding them. An adhesive is distributed over the loosely compacted particles. A veneer is thereafter applied on upon the layer of adhesive. The sandwich formed is subjected to hot plate pressure.

WO 2015/105455 discloses that holes and cracks of a wood veneer can be filled with material from a sub-layer comprising wood fibres and a binder during pressing. Thereby, a wood veneer of lower quality can be used.

WO 2015/105456 discloses a method of controlling permeation of a sub-layer through a wood veneer during pressing. Thereby, the design of the wood veneer after pressing can be controlled, by controlling the degree of permeation of materials from the sub-layer through the wood veneer.

In the above description, the different types of products have been described with reference to floorings. However, the same material and problems apply for other types of building panels, such as wall panels, ceiling panels, and for furniture components.

SUMMARY

It is an object of at least embodiments of the present disclosure to provide an improvement over the above described techniques and known art.

A further object of at least embodiments of the present disclosure is to make use of waste material originating from a MDF or HDF manufacturing process and/or recycled material.

A further object of at least embodiments of the present disclosure is to reduce a need for filling defects in the veneer such as a hole, crack, or knot with putty after pressing.

At least some of these and other objects and advantages that will be apparent from the description have been achieved by a method to produce a building panel according to a first aspect of the disclosure. The method comprises:

providing a core, applying a first paper layer on a first surface of the core, wherein the first paper layer preferably comprises a resin impregnated paper, applying refined lignocellulosic fibres on the first paper layer, applying a wood veneer layer above the refined lignocellulosic fibres, applying pressure to the core, the first paper layer, the refined lignocellulosic fibres, and the wood veneer layer to form a building panel.

The refined lignocellulosic fibres may be waste material originating from a MDF or HDF manufacturing process.

The refined lignocellulosic fibres may be recycled refined lignocellulosic fibres. The refined lignocellulosic fibres may be originating from recycled material, such as recycled products. The refined lignocellulosic fibres may be originating from reused material.

By refined lignocellulosic fibres are meant fibres processed in a refiner. Such a refiner is used in a MDF or HDF manufacturing process. Preferably, the fibres have been processed in the refiner and thereafter dried.

The refined lignocellulosic fibres may include fibre bundles, individual fibres, and/or broken fibres.

The fibre bundles, individual fibres, and/or broken fibres may be entangled or partially entangled.

The refined lignocellulosic fibres may be applied as free fibres. By free fibres is understood to mean not being bonded to each other as in a paper.

The refined lignocellulosic fibres may be applied as a powder.

The refined lignocellulosic fibres may be applied as loose fibres.

The refined lignocellulosic fibres may be applied as being free from any paper layer.

A layer formed by the refined lignocellulosic fibres may have a density per volume unit of less than 500 kg/m$^3$.

The refined lignocellulosic fibres contain lignocellulosic material.

The method may further comprise applying a second paper layer on the refined lignocellulosic fibres prior to applying the wood veneer layer and prior to pressing.

The first paper layer may be or comprise a resin impregnated paper.

The second paper layer may be or comprise a resin impregnated paper.

The first paper layer may be or comprise a resin impregnated decorative paper.

The resin impregnated decorative paper may be paper provided with a décor. The décor may be printed. The décor may match the wood veneer layer, for example the colour of the wood veneer layer.

The resin impregnated decorative paper may be a coloured paper. The colour may match the wood veneer layer, for example the colour of the wood veneer layer.

The first paper layer may be or comprise a resin impregnated overlay paper.

The second paper layer may be or comprise a resin impregnated overlay paper.

The resin of the resin impregnated paper may be a thermosetting resin, such as an amino resin. As an alternative, the resin may be polyurethane, or an acrylic resin or methacrylate resin.

The refined lignocellulosic fibres may originate from a refining step in a MDF or HDF manufacturing process.

The refined lignocellulosic fibres may be resinated refined lignocellulosic fibres. Resinated refined lignocellulosic fibres may have passed a refiner and a blender, wherein resin is added to the lignocellulosic fibres such that they are resinated. The resinated refined lignocellulosic fibres may be dried. The resin may be a thermosetting resin such as an amino resin. The resin may be or comprise an isocyanate.

The core may be formed prior to producing the building panel. The core may be formed in a separate process, prior to producing the building panel.

The core may be a wood-based board such as MDF or HDF board. The core may be a plywood board. The core may be a lamella core. The core may be a particleboard. The core may be a thermoplastic board.

An open structure in the wood veneer layer may be at least partly filled by the refined lignocellulosic fibres after pressing. An open structure may, for example, be a hole, a crack, a knot, etc. The open structure may be naturally occurring or may be intentionally formed in the wood veneer layer.

The refined lignocellulosic fibres may be applied in an amount of at least 25 $g/m^2$. The refined lignocellulosic fibres may be applied in an amount of 25-75 $g/m^2$, such as about 30-60 $g/m^2$, preferably 35-50 $g/m^2$.

The method may further comprises applying moisture to the first paper layer prior to applying the refined lignocellulosic fibres.

According to a second aspect of the present disclosure, a building panel is provided. The building panel comprises a core, a first paper layer arranged on a first surface of the core, wherein the first paper layer comprises a resin impregnated paper, refined lignocellulosic fibres arranged on the first paper layer, a wood veneer layer arranged above the refined lignocellulosic fibres, wherein an open structure in the wood veneer layer is at least partly filled with the refined lignocellulosic fibres.

The refined lignocellulosic fibres may be waste material originating from a MDF or HDF manufacturing process.

The refined lignocellulosic fibres may be recycled refined lignocellulosic fibres. The refined lignocellulosic fibres may be originating from recycled material, such as recycled products. The refined lignocellulosic fibres may be originating from reused material.

By refined lignocellulosic fibres are meant fibres processed in a refiner. Such a refiner is used in a MDF or HDF manufacturing process. Preferably, the fibres have been processed in the refiner and thereafter dried.

The refined lignocellulosic fibres may include fibre bundles, individual fibres, and/or broken fibres.

The fibre bundles, individual fibres, and/or broken fibres may be entangled or partially entangled.

The refined lignocellulosic fibres may be applied as a powder. The refined lignocellulosic fibres may be applied as loose fibres.

The refined lignocellulosic fibres may be applied as being free from any paper layer.

The refined lignocellulosic fibres contain lignocellulosic material.

The building panel may further comprise a second paper layer arranged on the refined lignocellulosic fibres.

The first paper layer may be or comprise a resin impregnated paper.

The second paper layer may be or comprise a resin impregnated paper.

The first paper layer may be or comprise a resin impregnated decorative paper.

The resin impregnated decorative paper may be paper provided with a décor. The décor may be printed. The décor may match the wood veneer layer, for example the colour of the wood veneer layer.

The resin impregnated decorative paper may be a coloured paper. The colour may match the wood veneer layer, for example the colour of the wood veneer layer.

The first paper layer may be or comprise a resin impregnated overlay paper.

The second paper layer may be or comprise a resin impregnated overlay paper.

The resin of the resin impregnated paper may be a thermosetting resin, such as an amino resin. As an alternative, the resin may be polyurethane, or an acrylic resin or methacrylate resin.

The refined lignocellulosic fibres may originate from a refining step in a MDF or HDF manufacturing process.

The refined lignocellulosic fibres may be resinated refined lignocellulosic fibres. Resinated refined lignocellulosic fibres may have passed a refiner and a blender, wherein resin is added to the lignocellulosic fibres such that they are resinated. The resinated refined lignocellulosic fibres may be dried. The resin may be a thermosetting resin such as an amino resin. The resin may be or comprise an isocyanate.

The core may be a wood-based board such as MDF or HDF board. The core may be a plywood board. The core may be a lamella core. The core may be a particleboard. The core may be a thermoplastic board.

An open structure in the wood veneer layer may be at least partly filled by the refined lignocellulosic fibres after pressing. An open structure may, for example, be a hole, a crack, a knot, etc. The open structure may be naturally occurring or may be intentionally formed in the wood veneer layer.

According to a third aspect of the present disclosure, a method to produce a building panel is provided. The method comprises:

providing a core, applying a liquid adhesive on a surface of the core, applying refined lignocellulosic fibres on the adhesive, applying a wood veneer layer above the refined lignocellulosic fibres, applying pressure to the core, the refined lignocellulosic fibres, and the wood veneer layer to form a building panel.

The refined lignocellulosic fibres may be waste material originating from a MDF or HDF manufacturing process.

The refined lignocellulosic fibres may be recycled refined lignocellulosic fibres. The refined lignocellulosic fibres may be originating from recycled material, such as recycled products. The refined lignocellulosic fibres may be originating from reused material.

By refined lignocellulosic fibres are meant fibres processed in a refiner. Such a refiner is used in a MDF or HDF manufacturing process. Preferably, the fibres have been processed in the refiner and thereafter dried.

The refined lignocellulosic fibres may include fibre bundles, individual fibres, and/or broken fibres.

The fibre bundles, individual fibres, and/or broken fibres may be entangled or partially entangled.

The refined lignocellulosic fibres may be applied as free fibres. By free fibres is understood to mean not being bonded to each other as in a paper.

The refined lignocellulosic fibres may be applied as a powder.

The refined lignocellulosic fibres may be applied as loose fibres.

The refined lignocellulosic fibres may be applied as being free from any paper layer.

A layer formed by the refined lignocellulosic fibres may have a density per volume unit of less than 500 $kg/m^3$.

The refined lignocellulosic fibres contain lignocellulosic material.

A binder of the adhesive may be selected from the group consisting of a hot melt, thermosetting resin, thermoplastic resin, and combinations thereof.

The binder of the adhesive may be selected from the group consisting of hot melt, reactive hot melt, amino resin, polyurethane, acrylic resin, methacrylic resin, and combinations thereof.

The method may further comprise applying a paper layer on the refined lignocellulosic fibres prior to applying the wood veneer layer and prior to pressing.

The paper layer may be or comprise a resin impregnated paper.

The paper layer may be or comprise a resin impregnated decorative paper.

The resin impregnated decorative paper may be a paper provided with a décor. The décor may be printed. The décor may match the wood veneer layer, for example the colour of the wood veneer layer.

The resin impregnated decorative paper may be a coloured paper. The colour may match the wood veneer layer, for example the colour of the wood veneer layer.

The paper layer may be or comprise a resin impregnated overlay paper.

The resin of the resin impregnated paper may be a thermosetting resin, such as an amino resin. As an alternative, the resin may be polyurethane, or an acrylic resin or a methacrylic resin.

The refined lignocellulosic fibres may originate from a refining step in a MDF or HDF manufacturing process.

The refined lignocellulosic fibres may be resinated refined lignocellulosic fibres. Resinated refined lignocellulosic fibres may have passed a refiner and a blender, wherein resin is added to the lignocellulosic fibres such that they are resinated. The resinated refined lignocellulosic fibres may be dried. The resin may be a thermosetting resin such as an amino resin. The resin may be or comprise an isocyanate.

The core may be formed prior to producing the building panel. The core may be formed in a separate process, prior to producing the building panel.

The core may be a wood-based board such as MDF or HDF board. The core may be a plywood board. The core may be a lamella core. The core may be a particleboard. The core may be a thermoplastic board.

An open structure in the wood veneer layer may be at least partly filled by the refined lignocellulosic fibres after pressing. The open structure may be a hole, a crack, a knot, etc. The open structure may be naturally occurring in the wood veneer layer or may be formed in the wood veneer layer prior to the present method.

The refined lignocellulosic fibres may be applied in an amount of at least 25 $g/m^2$. The refined lignocellulosic fibres may be applied in an amount of 25-75 $g/m^2$, such as about 30-60 $g/m^2$, preferably 35-50 $g/m^2$.

According to a fourth aspect of the present disclosure, a building panel is provided. The building panel comprises a core, an adhesive applied on a first surface of the core, refined lignocellulosic fibres arranged on the adhesive, a wood veneer layer arranged above the refined lignocellulosic fibres, wherein an open structure in the wood veneer layer is at least partly filled with the refined lignocellulosic fibres.

The refined lignocellulosic fibres may be waste material originating from a MDF or HDF manufacturing process.

The refined lignocellulosic fibres may be recycled refined lignocellulosic fibres. The refined lignocellulosic fibres may be originating from recycled material, such as recycled products. The refined lignocellulosic fibres may be originating from reused material.

By refined lignocellulosic fibres are meant fibres processed in a refiner. Such a refiner is used in a MDF or HDF manufacturing process. Preferably, the fibres have been processed in the refiner and thereafter dried.

The refined lignocellulosic fibres may include fibre bundles, individual fibres, and/or broken fibres.

The fibre bundles, individual fibres, and/or broken fibres may be entangled or partially entangled.

The refined lignocellulosic fibres may be applied as a powder. The refined lignocellulosic fibres may be applied as loose fibres.

The refined lignocellulosic fibres may be applied as being free from any paper layer.

The refined lignocellulosic fibres contain lignocellulosic material.

A binder of the adhesive may be selected from the group consisting of a hot melt, thermosetting resin, thermoplastic resin, and combinations thereof.

The binder of the adhesive may be selected from the group consisting of hot melt, reactive hot melt, amino resin, polyurethane, acrylic resin, methacrylic resin, and combinations thereof.

The building panel may further comprise a paper layer arranged on the refined lignocellulosic fibres.

The paper layer may be or comprise a resin impregnated paper.

The paper layer may be or comprise a resin impregnated decorative paper.

The resin impregnated decorative paper may be a paper provided with a décor. The décor may be printed. The décor may match the wood veneer layer, for example the colour of the wood veneer layer.

The resin impregnated decorative paper may be a coloured paper. The colour may match the wood veneer layer, for example the colour of the wood veneer layer.

The paper layer may be or comprise a resin impregnated overlay paper.

The resin of the resin impregnated paper may be a thermosetting resin, such as an amino resin. As an alternative, the resin may be polyurethane, or an acrylic resin or a methacrylic resin.

The refined lignocellulosic fibres may originate from a refining step in a MDF or HDF manufacturing process.

The refined lignocellulosic fibres may be resinated refined lignocellulosic fibres. Resinated refined lignocellulosic fibres may have passed a refiner and a blender, wherein resin is added to the lignocellulosic fibres such that they are resinated. The resinated refined lignocellulosic fibres may be dried. The resin may be a thermosetting resin such as an amino resin. The resin may be or comprise an isocyanate.

The core may be a wood-based board such as MDF or HDF board. The core may be a plywood board. The core may be a lamella core. The core may be a particleboard. The core may be a thermoplastic board.

An open structure in the wood veneer layer may be at least partly filled by the refined lignocellulosic fibres after pressing. The open structure may be a hole, a crack, a knot, etc. The open structure may be naturally occurring in the wood veneer layer or may be formed in the wood veneer layer prior to the present method.

According to a fifth aspect of the disclosure, a method to produce a building panel is provided. The method comprises:

- providing a core,
- applying refined lignocellulosic fibres on a first surface of the core, wherein the refined lignocellulosic fibres are resinated,
- applying a wood veneer layer above the refined lignocellulosic fibres,
- applying pressure to the core, the refined lignocellulosic fibres, and the wood veneer layer to form a building panel.

According to a sixth aspect of the disclosure, a method to produce a building panel is provided. The method comprises: providing a core, applying a binder on a surface of the core, applying an unimpregnated paper layer above the binder, applying a wood veneer layer above the unimpregnated paper layer, applying pressure to the core, the paper layer, and the wood veneer layer to form a building panel.

By unimpregnated is understood to mean free from added and/or synthetic resin, or substantially free from added and/or synthetic resin, such as comprising less than 10 wt. of added and/or synthetic resin, preferably less than 5 wt. % of added and/or synthetic resin such as less than 2.5 wt. % of added and/or synthetic resin. In one example, no synthetic resin has been added to the paper prior to pressing.

After pressing, the paper layer may be impregnated by the underlying binder.

The binder may be applied in liquid form, for example as a liquid adhesive.

The binder may be applied in powder form.

The core may be formed prior to producing the building panel.

The core may be a wood-based board such as MDF or HDF board. The core may be a plywood board. The core may be a lamella core. The core may be a particleboard. The core may be a thermoplastic board.

An open structure in the wood veneer layer may be at least partly filled by the paper layer after pressing. The open structure may be a hole, a crack, a knot, etc. The open structure may be naturally occurring in the wood veneer layer or may be formed in the wood veneer layer prior to the present method.

According to a seventh aspect of the disclosure, a building panel is provided. The building panel comprises a core, a binder applied on a surface of the core, a paper layer, which prior to pressing was unimpregnated, arranged on the binder, and a wood veneer layer arranged above the paper layer.

By unimpregnated is understood to mean free from added and/or synthetic resin, or substantially free from added and/or synthetic resin, such as comprising less than 10 wt. % of added and/or synthetic resin, preferably less than 5 wt. % of added and/or synthetic resin such as less than 2.5 wt. % of added and/or synthetic resin. In one example, no synthetic resin has been added to the paper prior to pressing.

After pressing, the paper layer may be impregnated by the underlying binder.

The core may be a wood-based board such as MDF or HDF board. The core may be a plywood board. The core may be a lamella core. The core may be a particleboard. The core may be a thermoplastic board.

BRIEF DESCRIPTION OF THE DRAWINGS

The present disclosure will by way of example be described in more detail with reference to the appended schematic drawings, which show embodiments of the present disclosure.

DETAILED DESCRIPTION

Figure 1:
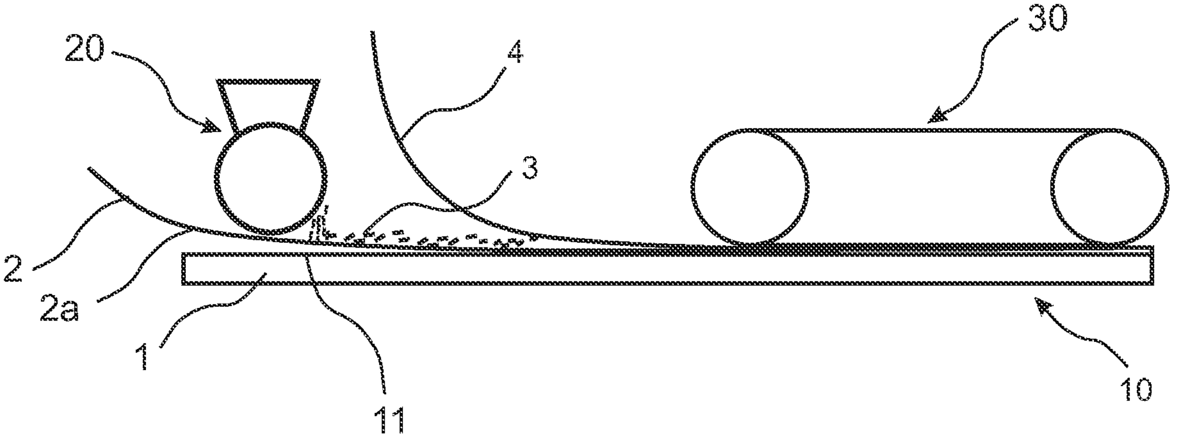
FIG. 1 shows a method according to a first embodiment.

A first embodiment of the present disclosure will now be described in more detail with reference to FIGS. 1-2. FIG. 1 shows schematically a method to produce a building panel 10. A core 1 is provided. The core 1 may be a wood-based board such as MDF or HDF board. The core 1 may be a plywood board. The core 1 may be a lamella core. The core 1 may be a particleboard. The core 1 may be a thermoplastic board. In an embodiment, the core 1 is produced prior to the present method.

On a first surface 11 of the core 1, a first paper layer 2 is applied. The first paper layer 2 may include at least one paper, such as a resin impregnated paper **2*a*. For example, the first paper layer 2 may include two papers, at least one of which may be a resin impregnated paper 2*a*. In one example, the first paper layer 2 is formed of the resin impregnated paper 2*a***. The resin is preferably a thermosetting resin, such as an amino resin, for example melamine formaldehyde resin. As alternative, the resin may be polyurethane, or an acrylic resin, or a methacrylic resin.

The resin impregnated paper **2*a* may be a decorative resin impregnated paper. The resin impregnated decorative paper may be paper provided with a décor. The décor may be printed on the paper. The décor may match a wood veneer layer 4** which is to be applied in a later step. As an alternative or complement, the decorative resin impregnated paper may be a coloured paper. The colour of the paper may match the wood veneer layer which is to be applied in a later step.

The resin impregnated paper 2*a* may be a resin impregnated overlay. As being an overlay paper, the paper will be substantially transparent after pressing, such as allowing a total transmittance of at 80% of incident light, such as at least 90%, such as at least 95%. The first paper layer 2 may be provided as individual pieces or in a continuous form, for example provided on a roll.

On a surface of the first paper layer 2 facing away from the core 1, refined lignocellulosic fibres 3 are applied. Refined lignocellulosic fibres 3 are wood fibres or wood chips that have been refined in a thermo-mechanical pulping refiner in an MDF or HDF process prior to the present method. The refined lignocellulosic fibres 3 are formed in a refining step in the MDF or HDF manufacturing process. In the refiner, steamed wood chips are converted into fibres or fibre bundles.

Prior to be used in the present method, the refined lignocellulosic fibres may be dried, such as to a moisture content of less than 20%, such as less than 15%.

The refined lignocellulosic fibres 3 may include fibre bundles, individual fibres, and/or broken fibres. The fibre bundles, individual fibres, and/or broken fibres may be entangled or partially entangled.

The refined lignocellulosic fibres 3 may be applied as free fibres. By free fibres is understood to mean not being bonded to each other as in a paper. The refined lignocellulosic fibres 3 may be applied as a powder, i.e., in powder from. The refined lignocellulosic fibres 3 may be applied as loose fibres. The refined lignocellulosic fibres 3 may be applied as being free from any paper layer.

Prior to pressing, the refined lignocellulosic fibres 3 may form a powder layer.

A layer formed by the refined lignocellulosic fibres 3 may have a density per volume unit of less than 500 kg/m$^3$.

The refined lignocellulosic fibres 3 contain lignocellulosic material. Lignin has not been removed, or at least not completely been removed, from the wood fibres.

The refined lignocellulosic fibres 3 may be resinated. If being resinated, the refined lignocellulosic fibres 3 have passed the refiner and a blender in the MDF or HDF process. In the blender, resin is added to the refined lignocellulosic fibres such that they are resinated. The amount of resin added may be less than 10 wt % based on solid content. The resinated refined lignocellulosic fibres may thereafter be dried prior to be used in the present method. The resin used to resinate the refined lignocellulosic fibres may be a thermosetting resin such as an amino resin, such as urea formaldehyde or melamine formaldehyde. The resin may be or comprise an isocyanate, such as monomeric methylene diphenyldiisocanate (MMDI) or polymeric methylene diphenyldiisocyanate (pDMI).

The refined lignocellulosic fibres 3 used in the present method may be waste fibres from the MDF or HDF production. Thereby, the method can make use of waste material from another production process. As an example, if the core 1 is a MDF or HDF board, waste material from the production process of the MDF or HDF board can be used when providing the MDF or HDF board with a veneer surface layer as in the present method.

In other examples, the refined lignocellulosic fibres may be recycled fibres. The refined lignocellulosic fibres may be originating from recycled material, such as recycled products. The refined lignocellulosic fibres may be originating from reused material.

The refined lignocellulosic fibres 3 may be applied in an amount of at least 25 g/m$^2$. The refined lignocellulosic fibres 3 may be applied in an amount of 25-75 g/m$^2$, such as about 30-60 g/m$^2$, preferably 35-50 g/m$^2$.

The refined lignocellulosic fibres 3 are applied on the first paper layer 2 in loose form.

The refined lignocellulosic fibres 3 may be applied by a scattering device 20, as shown in FIG. 1.

Prior to applying the refined lignocellulosic fibres 3, moisture may be applied on the first paper layer 2. Moisture may be applied as spray of water, and/or as steam. In one example, the amount of water applied may be 10-40 g/m$^2$. Thereby, the loose refined lignocellulosic fibres 3 may be bonded to the first paper layer 2. As an alternative or complement, the moisture content of the first paper layer 2 may be sufficient high such that the refined lignocellulosic fibres 3 stick to the first paper layer 2.

After the refined lignocellulosic fibres 3 have been applied on the first paper layer 2, a wood veneer layer 4 is applied above the refined lignocellulosic fibres 3.

The wood veneer layer 4 may be selected from oak, maple, birch, walnut, ash, and pine. The wood veneer layer 4 may have a thickness of less than 1 mm, such as 0.2 to 0.8 mm. The wood veneer layer may be cut veneer, sawn veneer, rotary cut veneer, and/or half-round cut veneer.

More than one layer of a wood veneer layer 4 may be applied on the refined lignocellulosic fibres 3. Wood veneer layers 4 may be arranged side by side above the refined lignocellulosic fibres 3, or above each other.

The wood veneer layer 4 may comprise open structures such as holes, knots and/or cracks. The open structures may be naturally occurring in the wood veneer layer 4, or may be formed intentionally in the wood veneer layer 4, for example by brushing. The open structures in the wood veneer layer 4 may extend through the thickness of the wood veneer layer 4 such that the open structure is extending from one surface of the wood veneer layer 4 to an opposing surface. The open structures in the wood veneer layer 4 may extend partially through the wood veneer layer 4 in the thickness direction.

After the wood veneer layer 4 has been applied, the refined lignocellulosic fibres 3 are sandwiched between the first paper layer 2 and the wood veneer layer 4.

On a second surface 12 of the core 1, facing away from the wood veneer layer 4, a balancing layer may be provided. The balancing layer may comprise an additional wood veneer layer.

After the wood veneer layer 4 has been applied, pressure and preferably also heat is applied to press the assembly together to form a building panel 10. Pressure may be applied in a continuous press 30, as shown in FIG. 1. As alternative or complement, a stationary press may be used.

The pressure applied may be in the range of 20-60 bar. The pressure time may be 10-60 s. The temperature applied may be in the range of 120–250° C.

When pressing, the wood veneer layer 4 is adhered to the core 1 by the resin in the resin impregnated paper 2*a*.

During pressing, the refined lignocellulosic fibres 3 are pressed to fill, or at least partly fill, any open structure 8 in the wood veneer layer 4. During pressing, the refined lignocellulosic fibres 3 will be pressed towards the open structures 8 in the wood veneer layer 4 where the pressure is lower, such that the refined lignocellulosic fibres 3 after pressing will fill, or at least partly fill, such open structures 8.

During pressing, the refined lignocellulosic fibres 3 may be bonded to each other by the resin in the first resin impregnated paper 2*a*. During pressing, resin from the resin impregnated paper 2*a* impregnates the refined lignocellulosic fibres 3. If the refined lignocellulosic fibres 3 are resinated, the resin provided with the refined lignocellulosic fibres 3 will further improve bonding.

During pressing, resin from the resin impregnated paper 2*a* may at least partly permeate the wood veneer layer 4.

After pressing, the resin impregnated paper 2*a* may be visible through such an open structure 8 of the wood veneer layer 4.

The building panel 10 thereby formed may be a floor panel, a wall panel, a furniture component, a building component, a worktop, etc. The building panel 10 may be divided into individual panels, and may be provided with a mechanical locking system.

Figure 2:
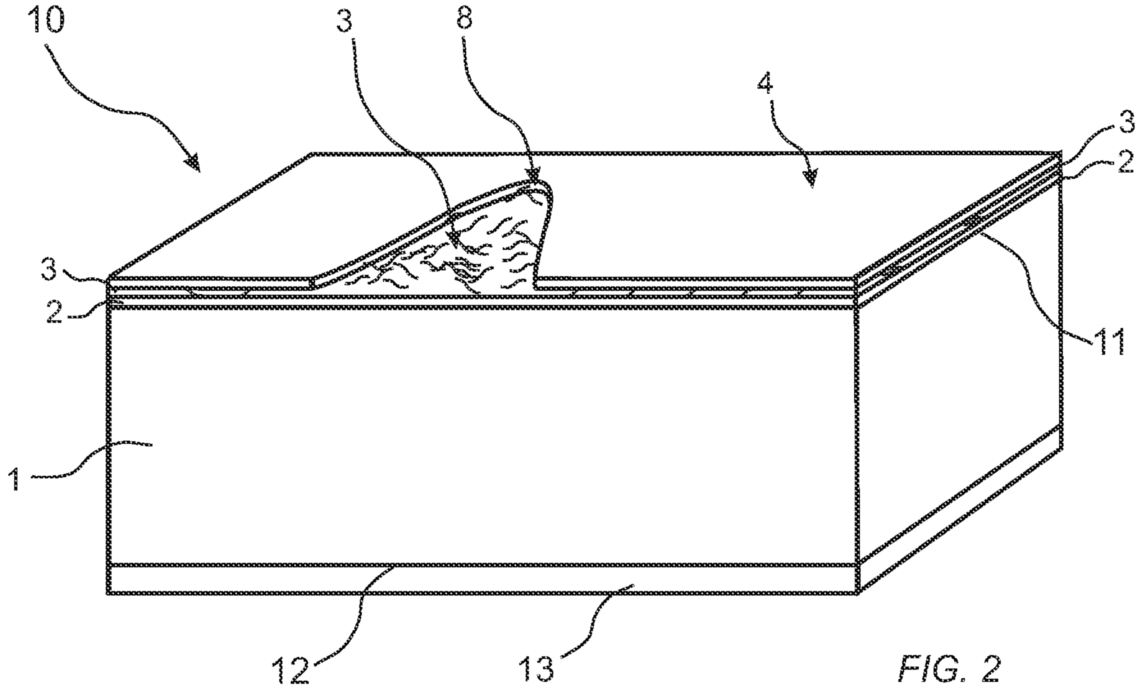
FIG. 2 shows a building panel produced according to the method shown in FIG. 1.

FIG. 2 shows the building panel 10 formed by the method described above with reference to FIG. 1 in more details. The building panel 10 is shown after pressing in FIG. 2.

As shown in FIG. 2, the wood veneer layer 4 comprises the open structure 8 such as a hole, for example a knot hole. As previously described with reference to FIG. 1, the first paper layer 2 in form of the resin impregnated paper 2*a* is arranged on the first surface 11 of the core 1. The refined lignocellulosic fibres 3 are disposed above the first paper layer 2 and below the wood veneer layer 4.

On the second surface 12 of the core 1, opposite the wood veneer layer 4, a balancing layer 13 is arranged. The balancing layer 13 is adapted to balance the layers arranged on the first surface 11 of the core 1. The balancing layer 13 may comprise an additional wood veneer layer.

As shown in more details in FIG. 2, the refined lignocellulosic fibres 3 are at least partially filling the open structure 8 in the wood veneer layer 4. The refined lignocellulosic fibres 3 may at least partially fill the open structure 8 in the wood veneer layer 4 in a direction parallel to the thickness to the wood veneer layer 4, and/or may at least partially fill the open structure 8 in a direction parallel to the longitudinal extension of the wood veneer layer 4.

As the refined lignocellulosic fibres 3 at least partially fill the open structure 8 in the wood veneer layer 4, there is no need to apply putty in the open structures 8 in an additional step after pressing.

The first paper layer 2 in form of the resin impregnated paper 2*a*, the refined lignocellulosic fibres 3, and the wood veneer layer 4 are bonded to each other by the resin provided in the resin impregnated paper 2*a*. The resin impregnated paper 2*a* is bonded to the first surface 11 of the core 2 by the resin in the resin impregnated paper 2*a*.

Figure 3:
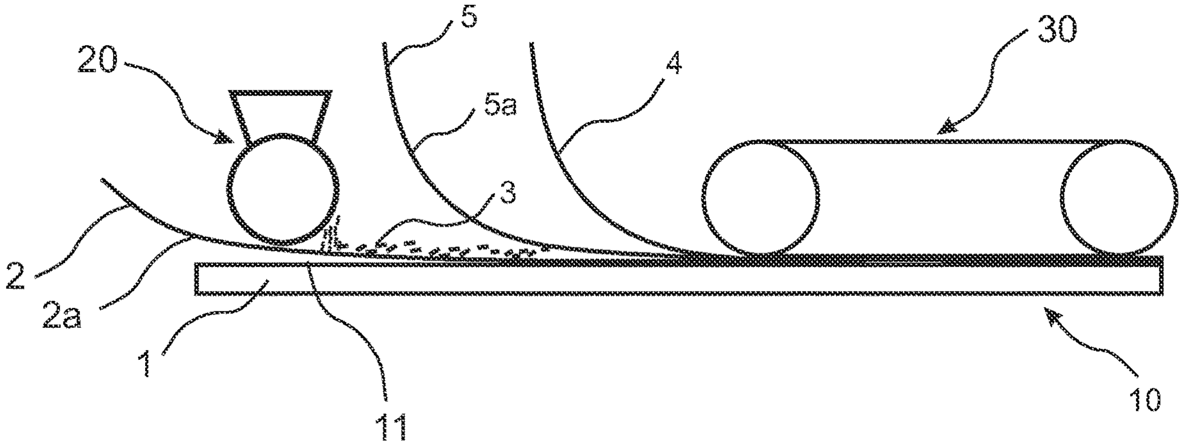
FIG. 3 shows method according to a second embodiment.

A second embodiment of the present disclosure will now be described in more detail with reference to FIGS. 3-4. Relevant disclosure from the first embodiment is applicable here. FIG. 3 shows schematically a method to produce a building panel 10. A core 1 is provided. The core 1 may be a wood-based board such as MDF or HDF board. The core 1 may be a plywood board. The core 1 may be a lamella core. The core 1 may be a particleboard. The core 1 may be a thermoplastic board. The core 1 is produced prior to the present method.

On a first surface 11 of the core 1, a first paper layer 2 is applied. The first paper layer 2 may include at least one paper, such as a resin impregnated paper 2*a*. For example, the first paper layer 2 may include two papers, at least one of which may be a resin impregnated paper 2*a*. In one example, the first paper layer 2 is formed of the resin impregnated paper 2*a*. The resin is preferably a thermosetting resin, such as an amino resin, for example melamine formaldehyde resin. As alternative, the resin may be polyurethane, or an acrylic resin or a methacrylic resin.

The resin impregnated paper 2*a* may be a decorative resin impregnated paper. The resin impregnated decorative paper may be paper provided with a décor. The décor may be printed on the paper. The décor may match a wood veneer layer which is to be applied in a later step. As an alternative or complement, the decorative resin impregnated paper may be a coloured paper. The colour of the paper may match the wood veneer layer which is to be applied in a later step.

The resin impregnated paper 2*a* may be a resin impregnated overlay paper. As being an overlay paper, the paper will be substantially transparent after pressing.

The first paper layer 2 may be provided as individual pieces or in a continuous form, for example provided on a roll.

On a surface of the first paper layer 2 facing away from the core 1, refined lignocellulosic fibres 3 are applied. Refined lignocellulosic fibres 3 are wood fibres or wood chips that have been refined in a thermo-mechanical pulping refiner in an MDF or HDF process prior to the present method. The refined lignocellulosic fibres 3 are formed in a refining step in the MDF or HDF manufacturing process. In the refiner, steamed wood chips are converted into fibres or fibre bundles.

Prior to be used in the present method, the refined lignocellulosic fibres 3 may be dried, such as to a moisture content of less than 20%, such as less than 15%.

The refined lignocellulosic fibres 3 may include fibre bundles, individual fibres, and/or broken fibres. The fibre bundles, individual fibres, and/or broken fibres may be entangled or partially entangled.

The refined lignocellulosic fibres 3 may be applied as free fibres. By free fibres is understood to mean not being bonded to each other as in a paper. The refined lignocellulosic fibres 3 may be applied as a powder, i.e., applied in powder form. The refined lignocellulosic fibres 3 may be applied as loose fibres. The refined lignocellulosic fibres 3 may be applied as being free from any paper layer.

Prior to pressing, the refined lignocellulosic fibres 3 may form a powder layer.

A layer formed by the refined lignocellulosic fibres 3 may have a density per volume unit of less than 500 kg/m$^3$.

The refined lignocellulosic fibres 3 contain lignocellulosic material. Lignin has not been removed, or at least not completely been removed, from the wood fibres.

The refined lignocellulosic fibres 3 may be resinated. If being resinated, the refined lignocellulosic fibres 3 have passed the refiner and a blender in the MDF or HDF process. In the blender, resin is added to the refined lignocellulosic fibres 3 such that they are resinated. The amount of resin added may be less than 10 wt % based on solid content. The resinated refined lignocellulosic fibres 3 may thereafter be dried prior to be used in the present method. The resin used to resinate the refined lignocellulosic fibres may be a thermosetting resin such as an amino resin, such as urea formaldehyde or melamine formaldehyde. The resin may be or comprise an isocyanate, such as monomeric methylene diphenyldiisocanate (MMDI) or polymeric methylene diphenyldiisocyanate (pDMI).

The refined lignocellulosic fibres 3 used in the present method may be waste fibres from the MDF or HDF production. Thereby, the method can make use of waste material from another production process. As an example, if the core 1 is a MDF or HDF board, waste material from the production process of the MDF or HDF board can be used when providing the MDF or HDF board with a veneered surface layer as in the present method.

In other examples, the refined lignocellulosic fibres may be recycled fibres. The refined lignocellulosic fibres may be originating from recycled material, such as recycled products. The refined lignocellulosic fibres may be originating from reused material.

The refined lignocellulosic fibres 3 may be applied in an amount of at least 25 g/m$^2$. The refined lignocellulosic fibres 3 may be applied in an amount of 25-75 g/m$^2$, such as about 30-60 g/m$^2$, preferably 35-50 g/m$^2$.

The refined lignocellulosic fibres 3 are applied in loose form on the first paper layer 2.

The refined lignocellulosic fibres 3 may be applied by a scattering device 20, as shown in FIG. 3.

Prior to applying the refined lignocellulosic fibres 3, moisture may be applied on the first paper layer 2. Moisture may be applied as spray of water, and/or as steam. In one example, the amount of water applied may be 10-40 g/m$^2$. Thereby, the loose refined lignocellulosic fibres 3 may be bonded to the first paper layer 2. As an alternative or complement, the moisture content of the first paper layer 2 may be sufficient high such that the refined lignocellulosic fibres 3 stick to the first paper layer 2.

After the refined lignocellulosic fibres 3 have been applied on the first paper layer 2, a second paper layer 5 is applied.

The second paper layer 5 may include at least one paper, such as a resin impregnated paper 5*a*. For example, the second paper layer 5 may include two papers, at least one of which may be a resin impregnated paper 5*a*. In one example, the second paper layer 5 is formed of the resin impregnated paper 5*a*. The resin is preferably a thermosetting resin such as an amino resin, for example melamine formaldehyde resin. As alternative, the resin may be polyurethane, or an acrylic resin or a methacrylic resin.

The resin impregnated paper 5*a* may be a decorative resin impregnated paper. The resin impregnated decorative paper may be paper provided with a décor. The décor may be printed on the paper. The décor may match a wood veneer layer which is to be applied in a later step. As an alternative or complement, the decorative resin impregnated paper may be a coloured paper. The colour of the paper may match the wood veneer layer which is to be applied in a later step.

The resin impregnated paper 5*a* may be a resin impregnated overlay paper. As being an overlay paper, the paper will be substantially transparent after pressing.

The second paper layer 5 may be provided as individual pieces or in a continuous form, for example provided on a roll.

After the second paper layer 5 has been applied, the refined lignocellulosic fibres 3 are arranged between the first paper layer 2 and the second paper layer 5.

A wood veneer layer 4 is thereafter applied above the second paper layer 5. The wood veneer layer 4 may be applied on the second paper layer 5.

The wood veneer layer 4 may be selected from oak, maple, birch, walnut, ash, and pine. The wood veneer layer 4 may have a thickness of less than 1 mm, such as 0.2 to 0.8 mm. The wood veneer layer may be cut veneer, sawn veneer, rotary cut veneer, and/or half-round cut veneer.

The wood veneer layer 4 may comprises open structures 8 such as holes, knots and/or cracks. The open structures 8 may be naturally occurring in the wood veneer layer 4, or may be formed intentionally in the wood veneer layer 4, for example by brushing. The open structures 8 in the wood veneer layer 4 may extend through the thickness of the wood veneer layer 4 such as extending from one surface of the wood veneer layer 4 to an opposing surface. The open structures 8 in the wood veneer layer 4 may extend partially through the wood veneer layer 4 in the thickness direction of the wood veneer layer 4.

More than one layer of a wood veneer may be applied on the refined lignocellulosic fibres 3. Wood veneer layers 4 may be arranged side by side above the refined lignocellulosic fibres 3, or above each other.

On a second surface 12 of the core 1, facing away from the wood veneer layer 4, a balancing layer may be provided. The balancing layer may comprise an additional wood veneer layer.

After the wood veneer layer 4 has been applied, pressure and preferably also heat is applied to press the assembly together to form a building panel 10. Pressure may be applied in a continuous press 30, as shown in FIG. 3. As an alternative, a stationary press may be used.

The pressure applied may be in the range of 20-60 bar. The pressure time may be 10-60 s. The temperature applied may be in the range of 120–250° C.

When pressing, the wood veneer layer 4 is adhered to the core 1 by at least the resin in the resin impregnated paper 2*a*, or by the resin in both the first paper layer 2 in form of the resin impregnated paper 2*a* and in the second paper layer 5 in form of the resin impregnated paper 5*a*.

During pressing, the refined lignocellulosic fibres 3 are pressed to fill, or at least partly fill, any open structure 8 in the wood veneer layer 4. During pressing, the refined lignocellulosic fibres 3 will be pressed towards the open structures 8 in the wood veneer layer 4 where the pressure is lower, such that the refined lignocellulosic fibres 3 after pressing will fill, or at least partly fill, such open structures 8.

Figure 4:
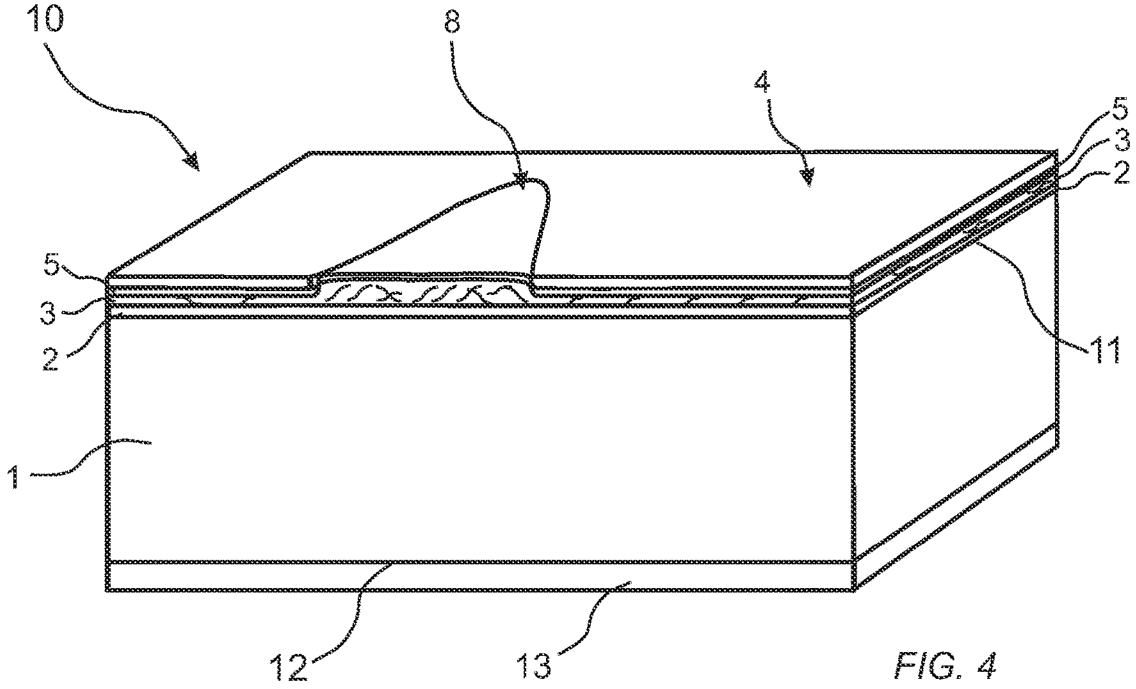
FIG. 4 shows a building panel produced according to the method shown in FIG. 3.

As a consequence of the refined lignocellulosic fibres being pressed into the open structure 8 of the wood veneer layer 4, the second paper layer 5 is pressed upwards into the open structure 8 of the wood veneer layer 8, as shown in more details in FIG. 4. The second paper layer 5 may be visible in the open structure of the wood veneer layer 4. The second paper layer 5 may be aligned or be in level with an upper surface of the wood veneer layer 4 in the open structure 8, as shown in FIG. 4.

During pressing, the refined lignocellulosic fibres 3 may be bonded to each other by the resin in the resin impregnated paper 2*a*, or by the resin in both the first paper layer 2 in form of the resin impregnated paper 2*a* and in the second paper layer 5 in form of the resin impregnated paper 5*a*.

After pressing, resin from the resin impregnated paper 2*a* of the first paper layer 2, and in some embodiments resin also from the second paper layer 5, may at least partly permeate the wood veneer layer 4.

During pressing, resin from the resin impregnated paper 2*a* impregnates the refined lignocellulosic fibres 3. If the second paper layer 5 is a resin impregnated paper 5*a*, resin from the second paper layer 5 may also impregnate the refined lignocellulosic fibres 3. If the refined lignocellulosic fibres 3 are resinated, the resin contained in the refined lignocellulosic fibres 3 improves bonding of the refined lignocellulosic fibres 3 to each other, to the first paper layer 2, to the second paper layer 5, and to the wood veneer layer 4 during pressing.

The building panel 10 thereby formed may be a floor panel, a wall panel, a furniture component, a building component, a worktop, etc. The building panel 10 may be divided into individual panels, and may be provided with a mechanical locking system.

FIG. 4 shows the building panel 10 formed by the method described above with reference to FIG. 3 in more details. The building panel 10 is shown after pressing in FIG. 4.

As shown in FIG. 4, the wood veneer layer 4 comprises the open structure 8 such as a hole, for example a knot hole. As previously described with reference to FIG. 3, the first paper layer 2 in form of the resin impregnated paper 2*a* is arranged on the first surface 11 of the core 1. The refined lignocellulosic fibres 3 are disposed above the first paper layer 2 and below the second paper layer 5. The wood veneer layer 4 is arranged on the second paper layer 5.

On the second surface 12 of the core 1, opposite the wood veneer layer 4, a balancing layer 13 is arranged. The balancing layer 13 is adapted to balance the layers arranged on the first surface 11 of the core 1. The balancing layer 13 may comprise an additional wood veneer layer.

As shown in more details in FIG. 4, the refined lignocellulosic fibres 3 and the second paper layer 5 are at least partially filling the open structure 8 in the wood veneer layer 4. The refined lignocellulosic fibres 3 may at least partially fill the open structure 8 in the wood veneer layer 4 in a direction parallel to the thickness to the wood veneer layer 4, and/or may at least partially fill the open structure 8 in a direction parallel to the longitudinal extension of the wood veneer layer 4.

The second paper layer 5 has been pressed towards an upper surface of the wood veneer layer 4 by the refined lignocellulosic fibres 3. Thereby, the second paper layer 5 may fill the open structure 8 in the wood veneer layer 4. In the open structure of the wood veneer layer 8, the second paper layer 5 may be arranged in level with the upper surface of the wood veneer layer 4. The second paper layer 5 is visible in the open structure 8 of the wood veneer layer 4.

As the refined lignocellulosic fibres 3 and the second paper layer 5 at least partially fill the open structure 8 in the wood veneer layer 4, there is no need to apply putty in any open structures 8 in an additional step after pressing.

The first paper layer 2, the second paper layer 5, the refined lignocellulosic fibres 3, and the wood veneer layer 4 are bonded to each other by the resin provided in the first paper layer 2 in form of the resin impregnated paper 2*a*, and optionally also in the resin in the second paper layer 5. The first paper layer 2 is bonded to the first surface 11 of the core 2 by the resin in the resin impregnated paper 2*a*.

Figure 5:
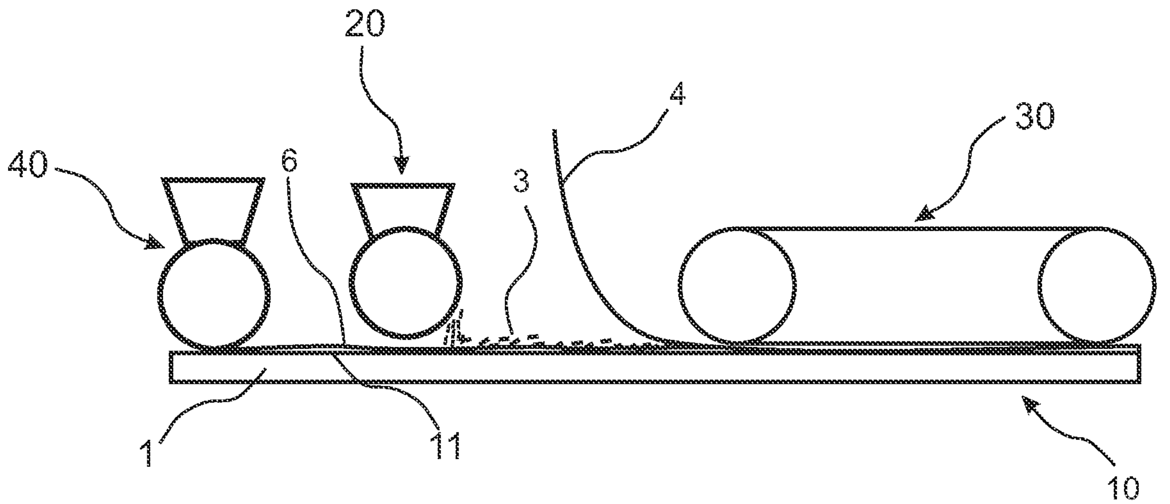
FIG. 5 method according to a third embodiment.

A third embodiment of the present disclosure will now be described in more detail with reference to FIGS. 5-6. Relevant disclosure from the first and second embodiments is applicable here. FIG. 5 shows schematically a method to produce a building panel 10. A core 1 is provided. The core 1 may be a wood-based board such as MDF or HDF board. The core 1 may be a plywood board. The core 1 may be a lamella core. The core 1 may be a particleboard. The core 1 may be a thermoplastic board. The core 1 is produced prior to the present method.

On a first surface 11 of the core 1, an adhesive 6 is applied. The adhesive 6 may be applied in liquid form. In an alternative or complement, the adhesive may be applied in powdered form.

The adhesive 6 may be applied by a roller 40, as shown in FIG. 5. As alternatives or complements, the adhesive 6 may be applied by spraying, or by curtain coating.

The adhesive 6 may be an aqueous solution.

The adhesive 6 comprises a binder. By applying the adhesive 6 in liquid form, the binder is thereby applied in liquid form.

The binder of the adhesive 6 may be a hot melt or a reactive hot melt.

The binder of the adhesive 6 may be a thermosetting resin such as an amino resin. The binder of the adhesive 6 may be a thermoplastic binder. The binder of the adhesive 6 may be polyurethane. The binder of the adhesive 6 may be acrylic resin or methacrylic resin.

The adhesive 6 may comprise the binder of the above disclosed type and additives.

The adhesive 6 may be applied in an amount such that the binder of the adhesive 6 is applied in an amount of 25-150 $g/m^2$. For example, if the adhesive 6 is applied as a 50/50 solution, comprising 50% of the binder and 50% water, the adhesive 6 may be applied in an amount of 50-300 $g/m^2$.

The adhesive 6 may form an adhesive layer on the first surface 11 of the core 1.

The adhesive 6 applied on the first surface 11 of the core 1 may be dried prior to applying the wood veneer layer 4; such as, prior to or after the refined lignocellulosic fibres 3 are applied.

On the adhesive 6 applied on the core 1, refined lignocellulosic fibres 3 are applied. Refined lignocellulosic fibres 3 are wood fibres or wood chips that have been refined in a thermo-mechanical pulping refiner in an MDF or HDF process prior to the present method. The refined lignocellulosic fibres 3 are formed in a refining step in the MDF or HDF manufacturing process. In the refiner, steamed wood chips are converted into fibres or fibre bundles.

Prior to be used in the present method, the refined lignocellulosic fibres 3 may be dried, such as to a moisture content of less than 20%, such as less than 15%.

The refined lignocellulosic fibres 3 may include fibre bundles, individual fibres, and/or broken fibres. The fibre bundles, individual fibres, and/or broken fibres may be entangled or partially entangled.

The refined lignocellulosic fibres 3 may be applied as free fibres. By free fibres is understood to mean not being bonded to each other as in a paper. The refined lignocellulosic fibres 3 may be applied as a powder, i.e., applied in powder form. The refined lignocellulosic fibres 3 may be applied as loose fibres. The refined lignocellulosic fibres 3 may be applied as being free from any paper layer.

Prior to pressing, the refined lignocellulosic fibres 3 may form a powder layer.

A layer formed by the refined lignocellulosic fibres 3 may have a density per volume unit of less than 500 $kg/m^3$.

The refined lignocellulosic fibres 3 contain lignocellulosic material. Lignin has not been removed, or at least not completely been removed, from the wood fibres.

The refined lignocellulosic fibres 3 may be resinated. If being resinated, the refined lignocellulosic fibres 3 have passed the refiner and a blender in the MDF or HDF process. In the blender, resin is added to the refined lignocellulosic fibres such that they are resinated. The amount of resin added may be less than 10 wt % based on solid content. The resinated refined lignocellulosic fibres may thereafter be dried prior to be used in the present method. The resin used to resinate the refined lignocellulosic fibres may be a thermosetting resin such as an amino resin, such as urea formaldehyde or melamine formaldehyde. The resin may be or comprise an isocyanate, such as monomeric methylene diphenyldiisocanate (MMDI) or polymeric methylene diphenyldiisocyanate (pDMI).

The refined lignocellulosic fibres 3 used in the present method may be waste refined lignocellulosic fibres from the MDF or HDF production. Thereby, the method can make use of waste material from another production process. As an example, if the core 1 is a MDF or HDF board, waste material from the production process of the MDF or HDF board can be used when providing the MDF or HDF board with a veneer surface layer as in the present method.

In other examples, the refined lignocellulosic fibres may be recycled fibres. The refined lignocellulosic fibres may be originating from recycled material, such as recycled products. The refined lignocellulosic fibres may be originating from reused material.

The refined lignocellulosic fibres 3 may be applied in an amount of at least 25 g/m$^2$. The refined lignocellulosic fibres 3 may be applied in an amount of 25-75 g/m$^2$, such as about 30-60 g/m$^2$, preferably 35-50 g/m$^2$.

The refined lignocellulosic fibres 3 are applied in loose form on the adhesive 6.

The refined lignocellulosic fibres 3 may be applied by a scattering device 20, as shown in FIG. 5.

After the refined lignocellulosic fibres 3 have been applied on the adhesive 6 applied on the first surface 11 of the core 1, a wood veneer layer 4 is applied above the refined lignocellulosic fibres 3.

The wood veneer layer 4 may be selected from oak, maple, birch, walnut, ash, pine. The wood veneer layer 4 may have a thickness of less than 1 mm, such as 0.2 to 0.8 mm. The wood veneer layer 4 may be cut veneer, sawn veneer, rotary cut veneer, and/or half-round cut veneer.

More than one layer of a wood veneer layer 4 may be applied on the refined lignocellulosic fibres 3. The wood veneer layers may be arranged side by side, or above each other.

The wood veneer layer 4 may comprises open structures 8 such as holes, knots and/or cracks. The open structures 8 may be naturally occurring in the wood veneer layer 4, or may be formed intentionally in the wood veneer layer 4, for example by brushing. The open structures in the wood veneer layer 4 may extend through the thickness of the wood veneer layer 4 such as extending through one surface of the wood veneer layer 4 to an opposing surface. The open structures in the wood veneer layer 4 may extend partially through the wood veneer layer 4 in the thickness direction of the wood veneer layer 4.

On a second surface 12 of the core 1, facing away from the wood veneer layer 4, a balancing layer may be provided. The balancing layer may comprise an additional wood veneer layer.

After the wood veneer layer 4 has been applied, pressure and preferably also heat is applied to press the assembly together to form a building panel 10. Pressure may be applied in a continuous press 30, as shown in FIG. 5. As alternative, a stationary press may be used.

The pressure applied may be in the range of 20-60 bar. The pressure time may be 10-60 s. The temperature applied may be in the range of 120-250° C.

When pressing, the wood veneer layer 4 is adhered to the core 1 by the adhesive 6.

During pressing, the refined lignocellulosic fibres 3 are pressed to fill, or at least partly fill, any open structure 8 in the wood veneer layer 4. During pressing, the refined lignocellulosic fibres 3 will be pressed towards the open structures 8 in the wood veneer layer 4 where the pressure is lower, such that the refined lignocellulosic fibres 3 after pressing will fill, or at least partly fill, such open structures 8.

During pressing, the refined lignocellulosic fibres 3 may be bonded to each other by the adhesive 6. If the refined lignocellulosic fibres 3 are resinated, the resin contained in the refined lignocellulosic fibres 3 improves bonding of the refined lignocellulosic fibres 3 to each other and to the wood veneer layer 4 during pressing.

During pressing, the adhesive 6 may at least partly permeate the wood veneer layer 4.

The adhesive 6 binds the refined lignocellulosic fibres 3 to each other and binds the wood veneer layer 4 to the core 1.

The building panel 10 thereby formed may be a floor panel, a wall panel, a furniture component, a building component, a worktop, etc. The building panel 10 may be divided into individual panels, and may be provided with a mechanical locking system.

Figure 6:
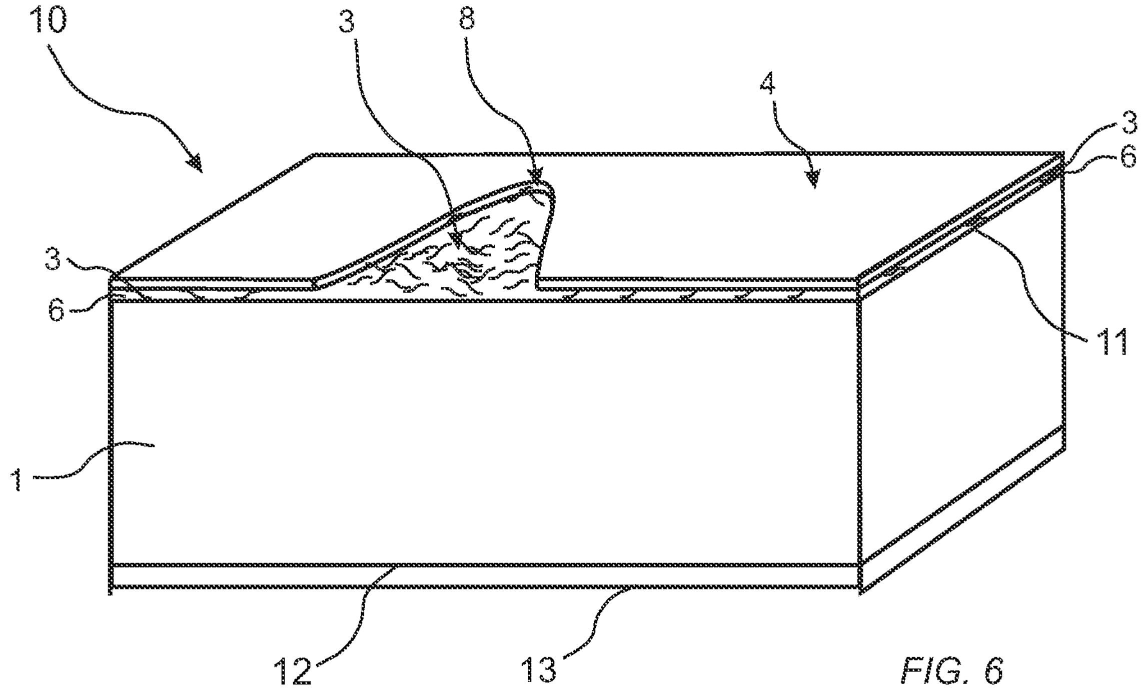
FIG. 6 shows a building panel produced according to the method shown in FIG. 5.

FIG. 6 shows the building panel 10 formed by the method described above with reference to FIG. 5 in more details. The building panel 10 is shown after pressing in FIG. 6.

As shown in FIG. 6, the wood veneer layer 4 comprises the open structure 8 such as a hole, for example a knot hole. As previously described with reference to FIG. 5, the adhesive 6 is applied on the first surface 11 of the core 1. The refined lignocellulosic fibres 3 are disposed in the adhesive 6 and below the wood veneer layer 4.

On the second surface 12 of the core 1, opposite the wood veneer layer 4, is a balancing layer 13 arranged. The balancing layer 13 is adapted to balance the layer arranged on the first surface 11 of the core 1. The balancing layer 13 may comprise an additional wood veneer layer.

As shown in more details in FIG. 6, the refined lignocellulosic fibres 3 are at least partially filling the open structure 8 in the wood veneer layer 4. The refined lignocellulosic fibres 3 may at least partially fill the open structure 8 in the wood veneer layer 4 in a direction parallel to the thickness to the wood veneer layer 4, and/or may at least partially fill the open structure 8 in a direction parallel to the longitudinal extension of the wood veneer layer 4.

As shown in FIG. 6, the refined lignocellulosic fibres 3 may fill the open structure 8 of the wood veneer layer 4 such as the refined lignocellulosic fibres 3 are in level with an upper surface of the wood veneer layer 4.

As the refined lignocellulosic fibres 3 at least partially fill the open structure 8 in the wood veneer layer 4, there is no need to apply putty in any open structures 8 in an additional step after pressing.

The core 1, the refined lignocellulosic fibres 3, and the wood veneer layer 4 are bonded to each other by the adhesive 6.

Figure 7:
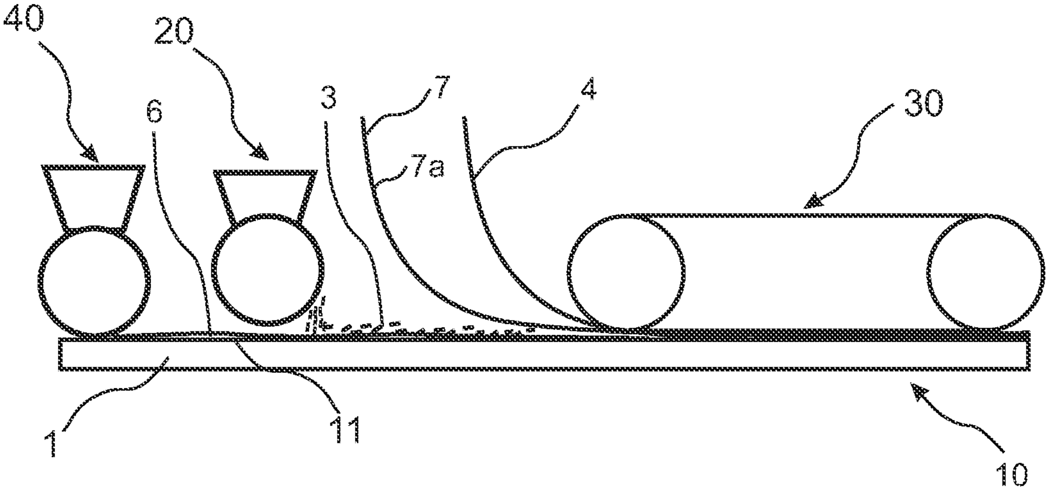
FIG. 7 shows a method according to a fourth embodiment.

A fourth embodiment of the present disclosure will now be described in more detail with reference to FIGS. 7-8. Relevant disclosure from the other embodiments is applicable here. FIG. 7 shows schematically a method to produce a building panel 10. A core 1 is provided. The core 1 may be a wood-based board such as MDF or HDF board. The core 1 may be a plywood board. The core 1 may be a lamella core. The core 1 may be a particleboard. The core 1 may be a thermoplastic board. The core 1 is produced prior to the present method.

On a first surface 11 of the core 1, an adhesive 6 is applied. The adhesive 6 may be applied in liquid form. In an alternative or complement, the adhesive may be applied in powdered form.

The adhesive 6 may be applied by a roller 40 as shown in FIG. 7. As alternatives or complements, the adhesive 6 may be applied by spraying, or by curtain coating.

The adhesive 6 may be an aqueous solution.

The adhesive 6 comprises a binder. By applying the adhesive 6 in liquid form, the binder is thereby applied in liquid form.

The binder of the adhesive 6 may be a hot melt or a reactive hot melt. The binder of the adhesive 6 may be a thermosetting resin such as an amino resin. The binder of the adhesive 6 may be a thermoplastic binder. The binder of the adhesive 6 may be polyurethane. The binder of the adhesive 6 may be acrylic resin or methacrylic resin.

The adhesive 6 may comprise the binder of the above disclosed type and additives.

The adhesive 6 may be applied in an amount such that the binder of the adhesive 6 is applied in an amount of 25-150 g/m$^2$. For example, if the adhesive 6 is applied as a 50/50 solution, comprising 50% of the binder and 50% water, the adhesive 6 may be applied in an amount of 50-300 g/m$^2$.

The adhesive 6 may form an adhesive layer on the first surface 11 of the core 1.

The adhesive 6 applied on the first surface 11 of the core 1 may be dried prior to applying the wood veneer layer 4.

On the adhesive 6 applied on the core 1, refined lignocellulosic fibres 3 are applied. Refined lignocellulosic fibres 3 are wood fibres or wood chips that have been refined in a thermo-mechanical pulping refiner in an MDF or HDF process prior to the present method. The refined lignocellulosic fibres 3 are formed in a refining step in the MDF or HDF manufacturing process. In the refiner, steamed wood chips are converted into fibres or fibre bundles.

Prior to be used in the present method, the refined lignocellulosic fibres 3 may be dried, such as to a moisture content of less than 20%, such as less than 15%.

The refined lignocellulosic fibres 3 may include fibre bundles, individual fibres, and/or broken fibres. The fibre bundles, individual fibres, and/or broken fibres may be entangled or partially entangled.

The refined lignocellulosic fibres 3 may be applied as free fibres. By free fibres is understood to mean not being bonded to each other as in a paper. The refined lignocellulosic fibres 3 may be applied as a powder, i.e., applied in powder form. The refined lignocellulosic fibres 3 may be applied as loose fibres. The refined lignocellulosic fibres 3 may be applied as being free from any paper layer.

Prior to pressing, the refined lignocellulosic fibres 3 may form a powder layer.

A layer formed by the refined lignocellulosic fibres 3 may have a density per volume unit of less than 500 kg/m$^3$.

The refined lignocellulosic fibres 3 contain lignocellulosic material. Lignin has not been removed, or at least not completely been removed, from the wood fibres.

The refined lignocellulosic fibres 3 may be resinated. If being resinated, the refined lignocellulosic fibres 3 have passed the refiner and a blender in the MDF or HDF process. In the blender, resin is added to the refined lignocellulosic fibres such that they are resinated. The amount of resin added may be less than 10 wt % based on solid content. The resinated refined lignocellulosic fibres may thereafter be dried prior to be used in the present method. The resin used to resinate the refined lignocellulosic fibres may be a thermosetting resin such as an amino resin, such as urea formaldehyde or melamine formaldehyde. The resin may be or comprise an isocyanate, such as monomeric methylene diphenyldiisocanate (MMDI) or polymeric methylene diphenyldiisocyanate (pDMI).

The refined lignocellulosic fibres 3 used in the present method may be waste refined lignocellulosic fibres from the MDF or HDF production. Thereby, the method can make use of waste material from another production process. As an example, if the core 1 is a MDF or HDF board, waste material from the production process of the MDF or HDF board can be used when providing the MDF or HDF board with a veneer surface layer as in the present method.

In other examples, the refined lignocellulosic fibres may be recycled fibres. The refined lignocellulosic fibres may be originating from recycled material, such as recycled products. The refined lignocellulosic fibres may be originating from reused material.

The refined lignocellulosic fibres 3 may be applied in an amount of at least 25 g/m$^2$. The refined lignocellulosic fibres 3 may be applied in an amount of 25-75 g/m$^2$, such as about 30-60 g/m$^2$, preferably 35-50 g/m$^2$.

The refined lignocellulosic fibres 3 are applied in loose form on the adhesive 6.

The refined lignocellulosic fibres 3 may be applied by a scattering device 20, as shown in FIG. 7.

After the refined lignocellulosic fibres 3 have been applied on the adhesive 6 applied on the first surface 11 of the core 1, a paper layer 7 is applied above the refined lignocellulosic fibres 3 and the adhesive 6.

The paper layer 7 may correspond to the first paper layer 2 and/or the second paper layer 5 in the embodiments described above with reference to FIGS. 1-2 and FIGS. 3-4.

The paper layer 7 may include at least one paper, such as a resin impregnated paper 7*a*. For example, the paper layer 7 may include two papers, at least one of which may be a resin impregnated paper 7*a*. In one example, the paper layer 7 is formed of the resin impregnated paper 7*a*. The resin is preferably a thermosetting resin such as an amino resin, for example melamine formaldehyde resin. As alternative, the resin may be polyurethane, or an acrylic resin or a methacrylic resin.

The resin impregnated paper 7*a* may be a decorative resin impregnated paper. The resin impregnated decorative paper may be paper provided with a décor. The décor may be printed on the paper. The décor may match a wood veneer layer which is to be applied in a later step. As an alternative or complement, the decorative resin impregnated paper may be a coloured paper. The colour of the paper may match the wood veneer layer which is to be applied in a later step.

The resin impregnated paper 7*a* may be a resin impregnated overlay paper. As being an overlay paper, the paper will be substantially transparent after pressing.

The paper layer 7 may be provided as individual pieces or in a continuous form, for example provided on a roll.

A wood veneer layer 4 is thereafter applied above the paper layer 7. The wood veneer layer 4 is applied on the paper 7. The wood veneer layer 4 may be selected from oak, maple, birch, walnut, ash, pine. The wood veneer layer 4 may have a thickness of less than 1 mm, such as 0.2 to 0.8 mm. The wood veneer layer 4 may be cut veneer, sawn veneer, rotary cut veneer, and/or half-round cut veneer. Several wood veneer pieces may together form the wood veneer layer 4.

The wood veneer layer 4 may comprises open structures 8 such as holes, knots and/or cracks. The open structures 8 may be naturally occurring in the wood veneer layer 4, or may be formed intentionally in the wood veneer layer 4, for example by brushing. The open structures in the wood veneer layer 4 may extend through the thickness of the wood veneer layer 4 such as extending from one surface of the wood veneer layer 4 to an opposing surface. The open structures in the wood veneer layer 4 may extend partially through the wood veneer layer 4 in the thickness direction of the wood veneer layer 4.

More than one layer of a wood veneer layer 4 may be applied on the paper layer 7. The wood veneer layers may be arranged side by side, or above each other.

On a second surface 12 of the core 1, facing away from the wood veneer layer 4, a balancing layer may be provided. The balancing layer may comprise an additional wood veneer layer.

After the wood veneer layer 4 has been applied, pressure and preferably also heat is applied to press the assembly together to form a building panel 10. Pressure may be applied in a continuous press 30, as shown in FIG. 7. As alternative, a stationary press may be used.

The pressure applied may be in the range of 20-60 bar. The pressure time may be 10-60 s. The temperature applied may be in the range of 120-250° C.

When pressing, the wood veneer layer 4 is adhered to the core 1 by the adhesive 6. If the paper layer 7 is a resin impregnated paper, the resin in the paper layer 7 may contribute to the bonding of the layers.

During pressing, the refined lignocellulosic fibres 3 are pressed to fill, or at least partly fill, any open structure 8 in the wood veneer layer 4. During pressing, the refined lignocellulosic fibres 3 will be pressed towards the open structures 8 in the wood veneer layer 4 where the pressure is lower, such that the refined lignocellulosic fibres 3 after pressing will fill, or at least partly fill, such open structures 8.

Figure 8:
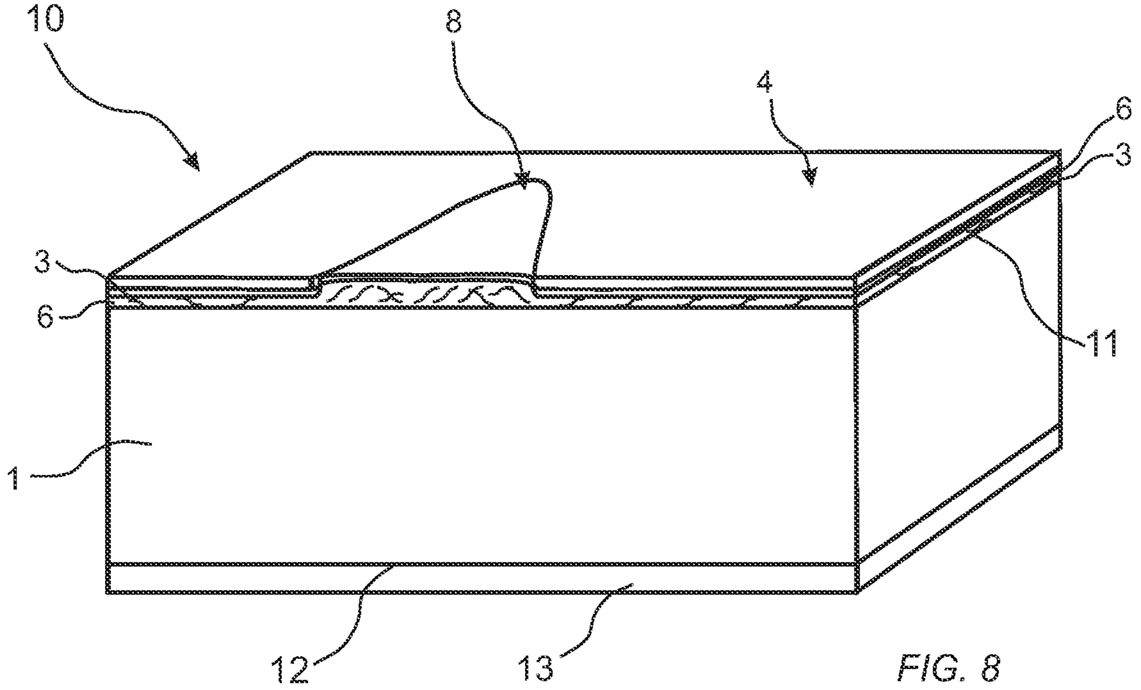
FIG. 8 shows a building panel produced according to the method shown in FIG. 7.

As a consequence of the refined lignocellulosic fibres 3 at least partially filing the open structure 8, the paper layer 7 is pressed upwards into the open structure 8 of the wood veneer layer 8, as shown in more details in FIG. 8. The paper layer 7 may be visible in the open structure of the wood veneer layer 4. The paper layer 7 may be aligned or be in level with an upper surface of the wood veneer layer 4.

During pressing, the refined lignocellulosic fibres 3 may be bonded to each other by the adhesive 6, and optionally by the resin in the paper layer 7. If the refined lignocellulosic fibres 3 are resinated, the resin from the refined lignocellulosic fibre 3 may further contribute to the bonding.

During pressing, the adhesive 6 may at least partly permeate the wood veneer layer 4. Optionally, resin from the resin impregnated paper **7*a* may at least permeate the wood veneer layer 4**.

The adhesive 6 binds the refined lignocellulosic fibres 3 to each other and binds the wood veneer layer 4 to the core 1.

If the refined lignocellulosic fibres 3 are resinated, the resin contained in the refined lignocellulosic fibres 3 improves bonding of the refined lignocellulosic fibres 3 to each other and to the wood veneer layer 4 during pressing.

The building panel 10 thereby formed may be a floor panel, a wall panel, a furniture component, a building component, a worktop, etc. The building panel 10 may be divided into individual panels, and may be provided with a mechanical locking system.

FIG. 8 shows the building panel 10 formed by the method described above with reference to FIG. 7 in more details. The building panel 10 is shown after pressing in FIG. 8.

As shown in FIG. 8, the wood veneer layer 4 comprises the open structure 8 such as a hole, for example a knot hole. As previously described with reference to FIG. 7, the adhesive 6 is applied on the first surface 11 of the core 1. The refined lignocellulosic fibres 3 are disposed in the adhesive 6. The paper layer 7 is arranged above the refined lignocellulosic fibres 3 and below the wood veneer layer 4.

On the second surface 12 of the core 1, opposite the wood veneer layer 4, is a balancing layer 13 arranged. The balancing layer 13 is adapted to balance the layer arranged on the first surface 11 of the core 1. The balancing layer 13 may comprise an additional wood veneer layer.

As shown in more details in FIG. 8, the refined lignocellulosic fibres 3 and the paper layer 7 are at least partially filling the open structure 8 in the wood veneer layer 4. The refined lignocellulosic fibres 3 may at least partially fill the open structure 8 in the wood veneer layer 4 in a direction parallel to the thickness to the wood veneer layer 4, and/or may at least partially fill the open structure 8 in a direction parallel to the longitudinal extension of the wood veneer layer 4.

As shown in FIG. 8, the refined lignocellulosic fibres 3 may fill the open structure 8 such as the refined lignocellulosic fibres 3 are in level with an upper surface of the wood veneer layer 4.

The paper layer 7 has been pressed towards an upper surface of the wood veneer layer 4 by the refined lignocellulosic fibres 3. Thereby, the paper layer 7 may fill the open structure 8 in the wood veneer layer 4. In the open structure of the wood veneer layer 8, the paper layer 7 may be aligned or in level with an upper surface of the wood veneer layer 4. The paper layer 7 may be visible in the open structure 8.

As the refined lignocellulosic fibres 3 and the paper layer 7 at least partially fill the open structure 8 in the wood veneer layer 4, there is no need to apply putty in any open structures 8 in an additional step after pressing.

The paper layer 7, the refined lignocellulosic fibres 3, the wood veneer layer 4, and the core 1 are bonded to each other by the adhesive 7, and optionally also by the resin of the paper layer 7.

Figure 9:
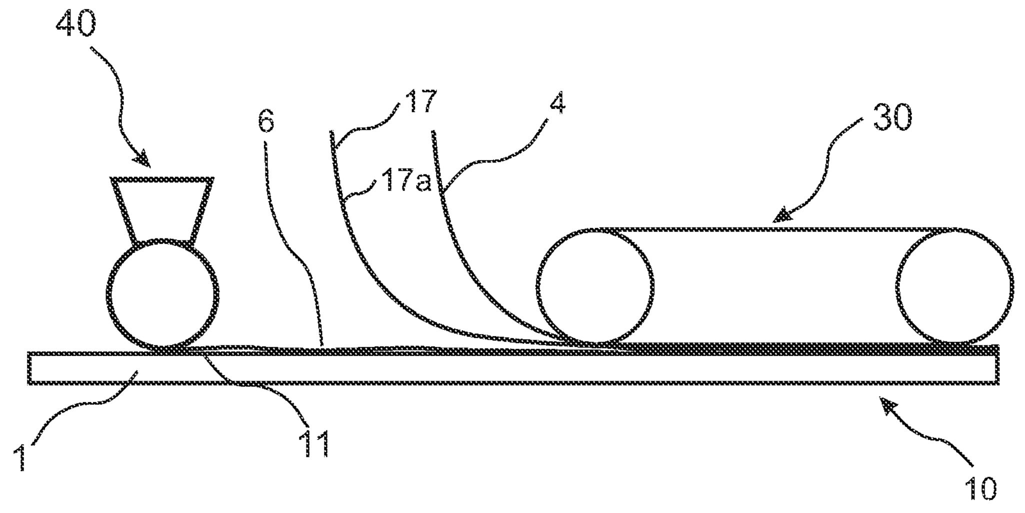
FIG. 9 shows a method according to a fifth embodiment.
Figure 10:
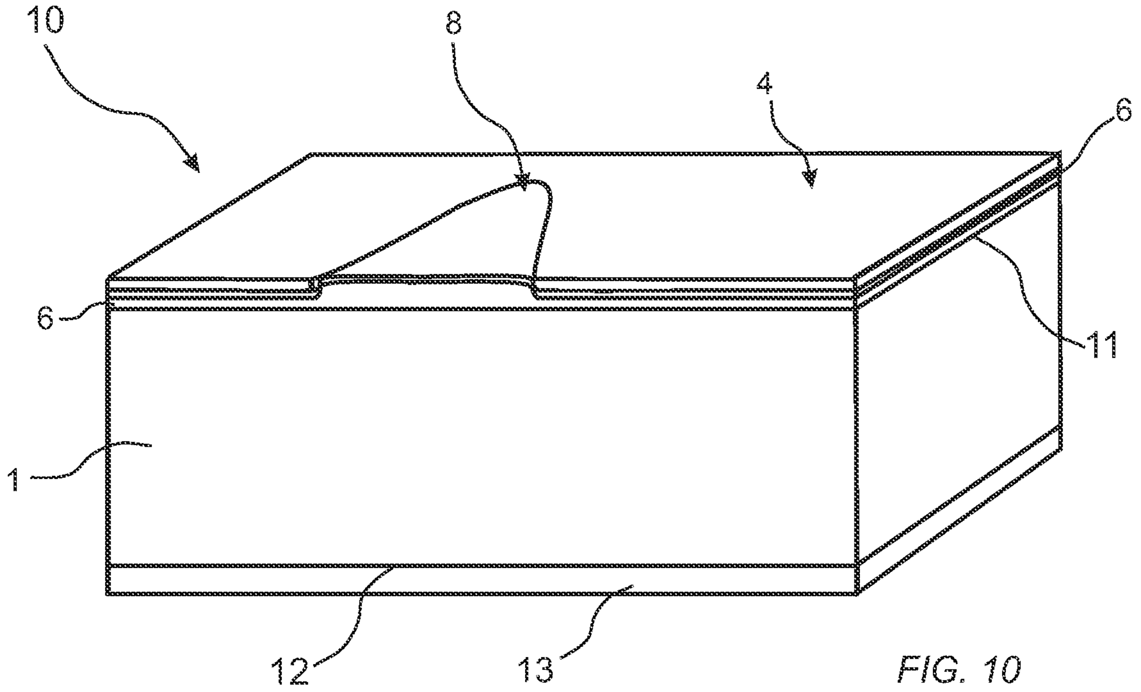
FIG. 10 shows a building panel produced according to the method shown in FIG. 9.

Another aspect of the disclosure is shown in FIGS. 9-10. Relevant disclosure from the other embodiments is applicable here. FIG. 9 shows schematically a method to produce a building panel 10. A core 1 is provided. The core 1 may be a wood-based board such as MDF or HDF board. The core 1 may be a plywood board. The core 1 may be a lamella core. The core 1 may be a particleboard. The core 1 may be a thermoplastic board. The core 1 is produced prior to the present method.

On a first surface 11 of the core 1, a binder 6 is applied. In FIG. 9, the binder 6 is applied as an adhesive being applied in liquid form.

As an alternative, the binder 6 may be applied in powder form. For example, the binder 6 may be applied by a scattering device (not shown).

The binder may be a thermosetting resin such as an amino resin. The binder may be a thermoplastic binder. The binder may be polyurethane. The binder may be acrylic resin or methacrylic resin.

The binder 6 applied in powder form may be applied in an amount of 25-150 g/$m^2$, preferably 50-100 g/$m^2$.

If the binder 6 is applied in liquid form in form of an adhesive comprising the binder, the adhesive may be applied by a roller 40 as shown in FIG. 9. As alternatives or complements, the adhesive may be applied by spraying, or by curtain coating.

If applied in liquid form, the adhesive may be an aqueous solution. The adhesive comprises a binder. The binder of the adhesive may be a hot melt or a reactive hot melt. The binder of the adhesive may be a thermosetting resin such as an amino resin. The binder of the adhesive may be a thermoplastic binder. The binder of the adhesive may be polyurethane. The binder of the adhesive may be acrylic resin or methacrylic resin.

The adhesive may comprise the binder of the above disclosed type and additives.

The adhesive may be applied in an amount such that the binder of the adhesive is applied in an amount of 25-150 g/$m^2$. For example, if the adhesive is applied as a 50/50 solution, comprising 50% of the binder and 50% water, the adhesive may be applied in an amount of 50-300 g/$m^2$.

The binder 6 applied in liquid form as an adhesive or the binder 6 in powder form may form an adhesive layer or binder layer on the first surface 11 of the core 1.

If applied in liquid form, the adhesive applied on the first surface 11 of the core 1 may be dried prior to applying the subsequent layers.

After the binder 6 has been applied on the first surface 11 of the core 1, and optionally dried, a paper layer 17 is applied on the binder 6.

The paper layer 17 may be or comprise an unimpregnated paper 17*a*. By unimpregnated is understood to mean a paper layer being free from added and/or synthetic resin, or at least substantially free from added and/or synthetic resin, such as comprising less than 10 wt. % added and/or synthetic resin, preferably less than added and/or synthetic 5 wt. % resin such as less than added and/or synthetic 2.5 wt. % resin. In one example, no synthetic resin has been added to the paper layer prior to pressing.

The unimpregnated paper 17*a* may be a decorative paper such as provided with a décor or coloured. The unimpregnated paper 17*a* may be an overlay. The unimpregnated paper 17*a* may be transparent after pressing.

The paper layer 17 may be provided as individual pieces or in a continuous form, for example provided on a roll.

A wood veneer layer 4 is thereafter applied above the unimpregnated paper layer 17. The wood veneer layer 4 is applied on the unimpregnated paper 17*a*. The wood veneer layer 4 may be selected from oak, maple, birch, walnut, ash, pine. The wood veneer layer 4 may have a thickness of less than 1 mm, such as 0.2 to 0.8 mm. The wood veneer layer 4 may be cut veneer, sawn veneer, rotary cut veneer, and/or half-round cut veneer. Several wood veneer pieces may together form the wood veneer layer 4.

The wood veneer layer 4 may comprises open structures 8 such as holes, knots and/or cracks. The open structures 8 may be naturally occurring in the wood veneer layer 4, or may be formed intentionally in the wood veneer layer 4, for example by brushing. The open structures in the wood veneer layer 4 may extend through the thickness of the wood veneer layer 4 such as extending from one surface of the wood veneer layer 4 to an opposing surface. The open structures in the wood veneer layer 4 may extend partially through the wood veneer layer 4 in the thickness direction of the wood veneer layer 4.

More than one layer of a wood veneer layer 4 may be applied on the unimpregnated paper layer 17. The wood veneer layers may be arranged side by side, or above each other.

On a second surface 12 of the core 1, facing away from the wood veneer layer 4, a balancing layer may be provided. The balancing layer may comprise an additional wood veneer layer.

After the wood veneer layer 4 has been applied, pressure and preferably also heat is applied to press the assembly together to form a building panel 10. Pressure may be applied in a continuous press 30, as shown in FIG. 9. As alternative, a stationary press may be used.

The pressure applied may be in the range of 20-60 bar. The pressure time may be 10-60 s. The temperature applied may be in the range of 120-250° C.

When pressing, the wood veneer layer 4 is adhered to the core 1 by the binder 6.

During pressing, the unimpregnated paper layer 17 is pressed to fill, or at least partly fill, any open structure 8 in the wood veneer layer 4.

During pressing, the unimpregnated paper layer 17 will be at least partly impregnated by the binder 6.

The unimpregnated paper layer 17 at least partly prevents binder 6 from being pressed through the wood veneer layer 4 to an upper surface of the wood veneer layer 4 during pressing. Permeation of binder 6 through the wood veneer layer 4 may be undesired due to the binder 6 may change the appearance of the upper surface of the wood veneer layer and/or discolour the upper surface of the wood veneer layer 4.

The unimpregnated paper layer 17 may absorb the binder 6 which would otherwise have permeated through the wood veneer layer 4 to the upper surface of the wood veneer layer 4. Sufficient binder 6 may permeate through the unimpregnated paper layer 17 to adhere the wood veneer layer 4 to the paper layer 17. However, superfluous binder 6 may be absorbed by the unimpregnated paper layer 17 in order to prevent binder 6 to permeate to the upper surface of the wood veneer layer 17.

The paper layer 17 may be visible in the open structure of the wood veneer layer 4. The paper layer 17 may be aligned or be in level with the upper surface of the wood veneer layer 4.

The building panel 10 thereby formed may be a floor panel, a wall panel, a furniture component, a building component, a worktop, etc. The building panel 10 may be divided into individual panels, and may be provided with a mechanical locking system.

FIG. 10 shows the building panel 10 formed by the method described above with reference to FIG. 9 in more details. The building panel 10 is shown after pressing in FIG. 9.

As shown in FIG. 10, the wood veneer layer 4 comprises the open structure 8 such as a hole, for example a knot hole. As previously described with reference to FIG. 9, the binder 6 is applied on the first surface 11 of the core 1. The paper layer 17, which was unimpregnated prior to pressing, is arranged above the binder 6 and below the wood veneer layer 4.

On the second surface 12 of the core 1, opposite the wood veneer layer 4, is a balancing layer 13 arranged. The balancing layer 13 is adapted to balance the layer arranged on the first surface 11 of the core 1. The balancing layer 13 may comprise an additional wood veneer layer.

As shown in FIG. 10, the paper layer 17, which was unimpregnated prior to pressing, has been pressed towards an upper surface of the wood veneer layer 4. Thereby, the paper layer 17 may fill the open structure 8 in the wood veneer layer 4. In the open structure of the wood veneer layer 8, the paper layer 17 may be aligned or in level with an upper surface of the wood veneer layer 4. The paper layer 17 may be visible in the open structure 8.

As the paper layer 17 at least partially fill the open structure 8 in the wood veneer layer 4, there is no need to apply putty in any open structures 8 in an additional step after pressing.

The paper layer 17, the wood veneer layer 4, and the core 1 are bonded to each other by the binder 6.

EXAMPLES

Example 1

In a reference example, two resin impregnated papers are arranged on a HDF core. The resin was melamine formaldehyde. A wood veneer layer having a thickness of 0.6 mm is arranged on the papers. The wood veneer layer has a hole in the form of a knot hole. A balancing layer was arranged on a lower surface of the HDF core. The assembly was pressed with a pressure of 60 bar under 35 s and 175° C.

After pressing, the paper layers have not filled the knot hole in the wood veneer layer.

In a further example, the number of papers was increased to four resin impregnated papers. The resin impregnated papers are arranged on a HDF core. A wood veneer layer having a thickness of 0.6 mm is arranged on the papers. The wood veneer layer has a hole in the form of a knot hole. A balancing layer was arranged on a lower surface of the HDF core. The assembly was pressed with a pressure of 60 bar under 35 s and at a temperature of 175° C.

After pressing, the paper layers have not filled the knot hole in the wood veneer layer.

Example 2

A resin impregnated paper was applied on a HDF core. The paper was impregnated with melamine formaldehyde. Refined lignocellulosic fibres obtained from a refiner in a HDF process were applied on the resin impregnated paper in an amount of 40 $g/m^2$. A wood veneer layer having a thickness of 0.6 mm is arranged on the refined lignocellulosic fibres. The wood veneer layer has a hole in the form of a knot hole. A balancing layer was arranged on a lower surface of the HDF core. The assembly was pressed with a pressure of 60 bar under 35 s and at a temperature of 175° C. Thereby, the layers are bonded to each other to form the building panel.

After pressing, the refined lignocellulosic fibres are filling the knot hole in the wood veneer layer. The refined lignocellulosic fibres are impregnated by the resin of the resin impregnated paper. The refined lignocellulosic fibres are visible in the knot hole.

Example 3

A first resin impregnated paper was applied on a HDF core. The first paper was impregnated with melamine formaldehyde. Refined lignocellulosic fibres obtained from a refiner in a HDF process were applied on the resin impregnated paper in an amount of 40 $g/m^2$. A second resin impregnated paper was applied on the refined lignocellulosic fibres applied on the first resin impregnated paper. The second paper was impregnated with melamine formaldehyde.

A wood veneer layer having a thickness of 0.6 mm is arranged on the second resin impregnated paper. The wood veneer layer has a hole in form of a knot hole. A balancing layer was arranged on a lower surface of the HDF core. The assembly was pressed with a pressure of 60 bar under 35 s and at a temperature of 175° C. Thereby, the layers are bonded to each other to form the building panel.

After pressing, the refined lignocellulosic fibres and the second resin impregnated paper are filling the knot hole in the wood veneer layer. The second resin impregnated paper has been pressed into the knot hole and is visible in the knot hole. The second resin impregnated paper is in level with an upper surface of the wood veneer layer. The refined lignocellulosic fibres are impregnated by the resin of the first and second resin impregnated papers.

Example 4

A resin impregnated paper was applied on a HDF core. The paper was impregnated with melamine formaldehyde. Refined lignocellulosic fibres obtained from a refiner in a HDF process were applied on the resin impregnated paper. The refined lignocellulosic fibres were applied in an amount of 42 $g/m^2$.

A wood veneer layer having a thickness of 0.6 mm is arranged on the refined lignocellulosic fibres. An open structure in form of a hole extending through the thickness of the wood veneer layer has been formed. The assembly was pressed with a pressure of 60 bar under 35 s and at a temperature of 175° C. Thereby, the layers are bonded to each other to form the building panel.

After pressing, the refined lignocellulosic fibres are filling the hole in the wood veneer layer. The amount of refined lignocellulosic fibres applied is sufficient to fill the hole in the wood veneer layer.

Example 5

A resin impregnated paper was applied on a HDF core. The paper was impregnated with melamine formaldehyde. Refined lignocellulosic fibres obtained from a refiner in a HDF process were applied on the resin impregnated paper. The refined lignocellulosic fibres were applied in an amount of 84 $g/m^2$.

A wood veneer layer having a thickness of 0.6 mm is arranged on the refined lignocellulosic fibres. An open structure in form of a hole extending through the thickness of the wood veneer layer has been formed. The assembly was pressed with a pressure of 60 bar under 35 s and at a temperature of 175° C. Thereby, the layers are bonded to each other to form the building panel.

After pressing, the refined lignocellulosic fibres are filling the hole in the wood veneer layer. The amount of refined lignocellulosic fibres applied is more than necessary to fill the hole in the wood veneer layer. After pressing, some refined lignocellulosic fibres are not bonded to each other in the hole in the wood veneer layer and can be removed after pressing.

Example 6

A resin impregnated paper was applied on a HDF core. The paper was impregnated with melamine formaldehyde. Refined lignocellulosic fibres obtained from a refiner in a HDF process were applied on the resin impregnated paper. The refined lignocellulosic fibres were applied in an amount of 21 $g/m^2$.

A wood veneer layer having a thickness of 0.6 mm is arranged on the refined lignocellulosic fibres. A hole extending through the thickness of the wood veneer layer has been formed. The assembly was pressed with a pressure of 60 bar under 35 s and at a temperature of 175° C. Thereby, the layers are bonded to each other to form the building panel.

After pressing, the refined lignocellulosic fibres are not completely filling the hole in the wood veneer layer. The amount of refined lignocellulosic fibres applied is less than required to fill the hole in the wood veneer layer. After pressing, portions of the hole are not filled by the refined lignocellulosic fibres.

Example 7

An adhesive in form of an aqueous melamine formaldehyde solution (50/50 solution) was applied on a HDF core in an amount of 155 $g/m^2$. An unimpregnated paper was applied on the adhesive layer. A wood veneer layer having a thickness of 0.6 mm was arranged on the unimpregnated paper. The assembly was pressed with a pressure of 60 bar under 35 s and at a temperature of 175° C. Thereby, the layers are bonded to each other to form the building panel.

After pressing, the previously unimpregnated paper has prevented adhesive to permeate through the wood veneer layer to an upper surface of the wood veneer layer. Binder in the adhesive has been absorbed by the paper. The paper has been pressed into any open structure in the wood veneer layer.

Example 8

A binder in form of melamine formaldehyde resin was applied on a HDF core in powder form in an amount of 80 g/m$^2$. An unimpregnated paper was applied on the binder layer. A wood veneer layer having a thickness of 0.6 mm was arranged on the unimpregnated paper. The assembly was pressed with a pressure of 60 bar under 35 s and at a temperature of 175° C. Thereby, the layers are bonded to each other to form the building panel.

After pressing, the previously unimpregnated paper has prevented binder to permeate through the wood veneer layer to an upper surface of the wood veneer layer. The binder has been absorbed by the paper. The paper has been pressed into any open structure in the wood veneer layer.

The invention claimed is:

1. A method to produce a building panel, comprising providing a core, applying a first paper layer on a first surface of the core, wherein the first paper layer comprises a resin impregnated paper, applying refined lignocellulosic fibres on the first paper layer, applying a wood veneer layer above the refined lignocellulosic fibres, applying pressure to the core, the first paper layer, the refined lignocellulosic fibres, and the wood veneer layer to form a building panel.

2. The method according to claim 1, further comprising applying a second paper layer on the refined lignocellulosic fibres prior to applying the wood veneer layer and prior to applying the pressure.

3. The method according to claim 2, wherein the second paper layer comprises a resin impregnated paper.

4. The method according to claim 2, wherein the first paper layer and/or the second paper layer comprises a resin impregnated decorative paper.

5. The method according to claim 2, wherein the first paper layer and/or the second paper layer comprises a resin impregnated overlay paper.

6. The method according to claim 1, wherein the refined lignocellulosic fibres are resinated refined lignocellulosic fibres.

7. The method according to claim 1, wherein refined lignocellulosic fibres are originating from a refining step in a MDF or HDF manufacturing process.

8. The method according to claim 1, wherein the refined lignocellulosic fibres are applied as a powder.

9. The method according to claim 1, wherein the core is formed prior to producing the building panel.

10. The method according to claim 1, wherein an open structure in the wood veneer layer is at least partly filled by the refined lignocellulosic fibres after pressing.

11. The method according to claim 1, wherein the refined lignocellulosic fibres are applied in an amount of 25-75 g/m$^2$.

12. The method according to claim 1, further comprising applying moisture to the first paper layer prior to applying the refined lignocellulosic fibres.

* * * * *